(12) United States Patent
Yoshino et al.

(10) Patent No.: US 11,104,538 B1
(45) Date of Patent: Aug. 31, 2021

(54) METHOD FOR PRODUCING PRINTED MATERIAL AND SYSTEM FOR PRODUCING PRINTED MATERIAL

(71) Applicant: FUJIFILM Business Innovation Corp., Tokyo (JP)

(72) Inventors: Susumu Yoshino, Kanagawa (JP); Yoshifumi Iida, Kanagawa (JP); Satoshi Kamiwaki, Kanagawa (JP); Sakae Takeuchi, Kanagawa (JP); Satomi Kashiwagi, Kanagawa (JP); Sumiaki Yamasaki, Kanagawa (JP); Takahiro Ishizuka, Kanagawa (JP); Shigeru Seitoku, Kanagawa (JP); Kiyohiro Yamanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/986,225

(22) Filed: Aug. 5, 2020

(30) Foreign Application Priority Data

Feb. 27, 2020 (JP) .............................. JP2020-032196

(51) Int. Cl.
*B65H 37/04* (2006.01)
*B65H 37/02* (2006.01)
*C09J 125/14* (2006.01)

(52) U.S. Cl.
CPC ............ *B65H 37/04* (2013.01); *B65H 37/02* (2013.01); *C09J 125/14* (2013.01); *B65H 2519/00* (2013.01); *B65H 2801/48* (2013.01)

(58) Field of Classification Search
CPC .... B65H 37/02; B65H 37/04; B65H 2519/00; B65H 2801/48; C09J 125/14
USPC ............................................ 270/58.07, 58.08
See application file for complete search history.

(56) References Cited

U.S. PATENT DOCUMENTS

| | | | |
|---|---|---|---|
| 7,217,746 B2 * | 5/2007 | Munro ...................... | B05D 1/00 427/256 |
| 10,409,189 B2 * | 9/2019 | Ueda ................... | G03G 9/08797 |
| 10,698,328 B2 * | 6/2020 | Kawamura ........ | G03G 9/08782 |
| 2012/0251169 A1 * | 10/2012 | Aoki ................... | G03G 15/0189 399/111 |

FOREIGN PATENT DOCUMENTS

| | | |
|---|---|---|
| JP | 2009269365 | 11/2009 |
| JP | 2015200813 | 11/2015 |
| JP | 2016169101 | 9/2016 |

* cited by examiner

*Primary Examiner* — Leslie A Nicholson, III
(74) *Attorney, Agent, or Firm* — JCIPRNET

(57) ABSTRACT

A method for producing a printed material includes providing pressure-induced phase transition particles to a part of an outside margin portion or a portion to be folded of a recording medium; bonding the pressure-induced phase transition particles to the recording medium; and pressure-bonding a multilayer body in which plural recording media are stacked, the recording media including the recording medium having the pressure-induced phase transition particles bonded thereon.

19 Claims, 5 Drawing Sheets

FIG. 6
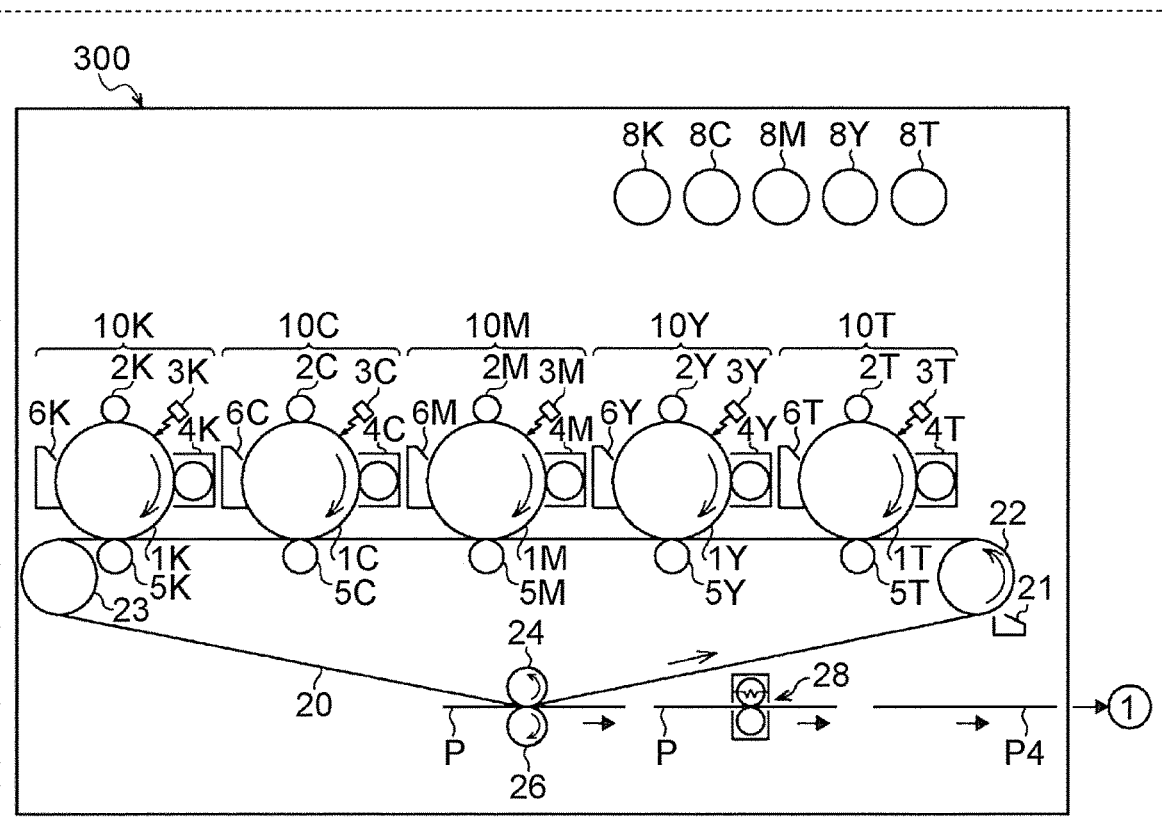
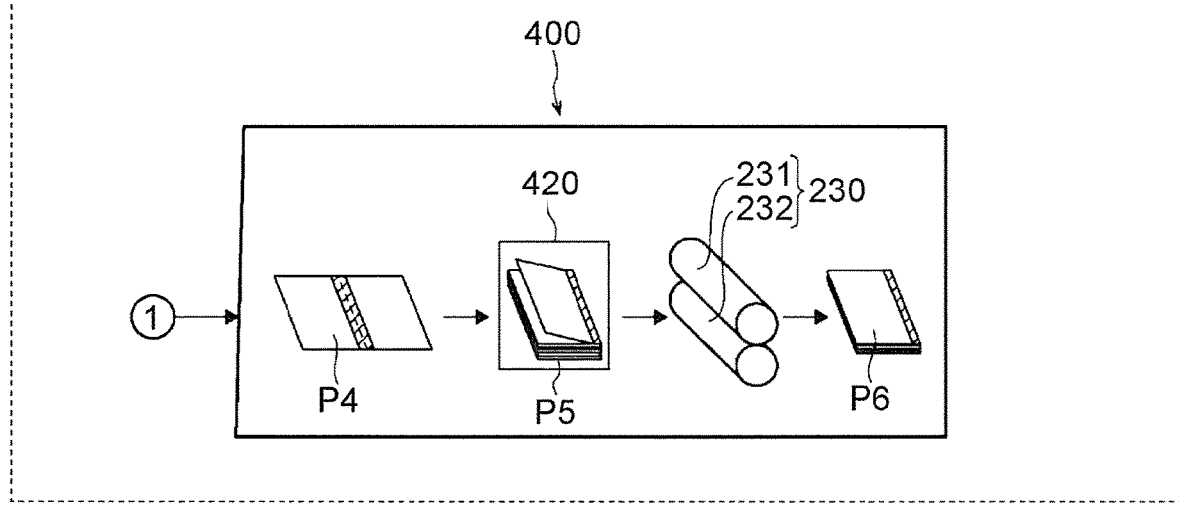

METHOD FOR PRODUCING PRINTED MATERIAL AND SYSTEM FOR PRODUCING PRINTED MATERIAL

CROSS-REFERENCE TO RELATED APPLICATIONS

This application is based on and claims priority under 35 USC 119 from Japanese Patent Application No. 2020-032196 filed Feb. 27, 2020.

BACKGROUND

(i) Technical Field

The present disclosure relates to a method for producing a printed material and a system for producing a printed material.

(ii) Related Art

Japanese Unexamined Patent Application Publication No. 2009-269365 describes a booklet form that includes multiple rectangular sheets that are stacked and are integrated by being bonded at one side end. The multiple sheets include a top sheet, a bottom sheet, and multiple intermediate sheets that are smaller in size than the top sheet and the bottom sheet and are sandwiched between the top sheet and the bottom sheet. In a portion where the top sheet and the bottom sheet are directly bonded to each other, an adhesive is applied to a particular position in a rear surface of the top sheet so as to form multiple adhesive lines corresponding to a set adhesive force, a releasing agent layer is disposed on a front surface of the bottom sheet, and the adhesive that is applied to the rear surface of the top sheet so as to form multiple adhesive lines are peelably bonded to the releasing agent layer on the front surface of the bottom sheet.

Japanese Unexamined Patent Application Publication No. 2015-200813 describes an image forming apparatus that forms a toner image, which is used for bonding, in a binding margin of a recording medium and forms an image-forming toner image in an image portion of the recording medium. The image forming apparatus includes a latent image carrier having a surface on which a latent image is to be formed, a developing device in which a developer is carried on a surface of a developer carrier and conveyed so as to develop the latent image on the latent image carrier into a toner image by using the developer on the surface of the developer carrier, and a transfer section that transfers the toner image on the latent image carrier onto a sheet-shaped recording medium. The amount of the developer per unit area on the developer carrier is adjusted to be different between when a latent image corresponding to the toner image used for bonding is developed and when a latent image corresponding to the image-forming toner image is developed.

Japanese Unexamined Patent Application Publication No. 2016-169101 describes a sheet material processing apparatus equipped with a sheet material bonding section that bonds multiple sheet materials by heating toner images for bonding formed on the sheet materials. In this apparatus, a heating section that heats the toner images for bonding is a dielectric heating section that dielectrically heats a toner for bonding by forming a high-frequency AC field.

SUMMARY

One example of a method for producing a printed material is a method that includes a step of providing pressure-induced phase transition particles to at least part of an outside margin portion or a portion to be folded of a recording medium, a step of bonding the pressure-induced phase transition particles to the recording medium, and a step of pressure-bonding a multilayer body obtained by stacking multiple recording media including the recording medium having the pressure-induced phase transition particles bonded thereon (hereinafter, this method may be referred to as a "particular method"). In this particular method, the bonding force achieved by pressure bonding in the bound portion of the obtained printed material is desirably high. Hereinafter, the bonding force achieved by pressure bonding in the bound portion may simply be referred to as the "bonding force in the bound portion".

Aspects of non-limiting embodiments of the present disclosure relate to a method for producing a printed material with which a printed material having a high bonding force in the bound portion can be produced compared to when particles containing a styrene resin and a (meth)acrylic acid ester resin which is a homopolymer of a (meth)acrylic acid ester are used as the pressure-induced phase transition particles in the aforementioned particular method.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a printed material, the method including providing pressure-induced phase transition particles to a part of an outside margin portion or a portion to be folded of a recording medium; bonding the pressure-induced phase transition particles to the recording medium; and pressure-bonding a multilayer body in which a plurality of recording media are stacked, the recording media including the recording medium having the pressure-induced phase transition particles bonded thereon. The pressure-induced phase transition particles contain a styrene resin containing styrene and a vinyl monomer other than styrene as polymerization components, and a (meth)acrylic acid ester resin that contains at least two (meth)acrylic acid esters as polymerization components, and a mass ratio of the (meth)acrylic acid esters relative to a total of polymerization components of the (meth)acrylic acid ester resin is 90 mass % or more. The pressure-induced phase transition particles have at least two glass transition temperatures, and the difference between the lowest glass transition temperature and the highest glass transition temperature among the glass transition temperatures exhibited by the pressure-induced phase transition particles is 30° C. or more.

BRIEF DESCRIPTION OF THE DRAWINGS

Exemplary embodiments of the present disclosure will be described in detail based on the following figures, wherein:

FIG. 6 is a schematic diagram illustrating another example of a system for producing a printed material according to an exemplary embodiment.

DETAILED DESCRIPTION

Figure 1:
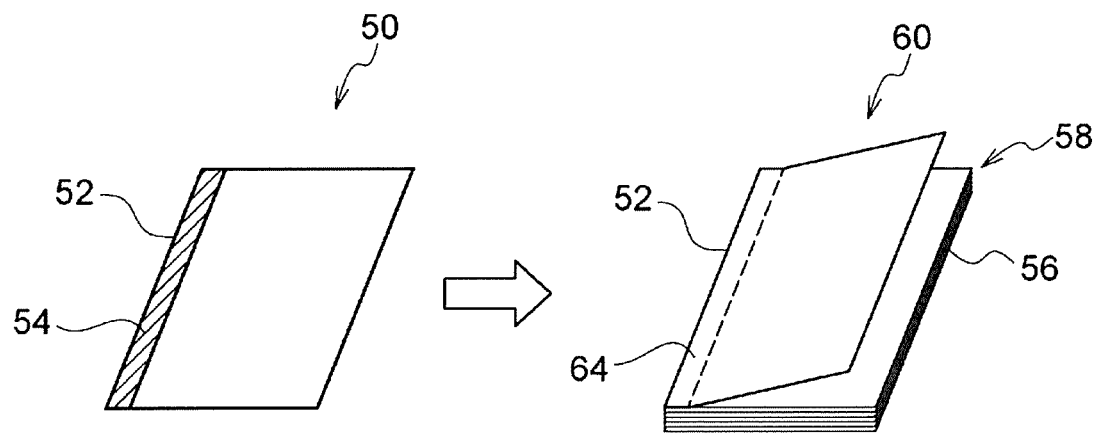
FIG. 1 is a schematic diagram illustrating one example of a recording medium and a printed material according to an exemplary embodiment.

Exemplary embodiments of the present disclosure will now be described. The following descriptions and examples are merely exemplary embodiments and do not limit the scopes of the exemplary embodiments.

When numerical ranges are described stepwise in the present description, the upper limit or the lower limit of one numerical range may be substituted with an upper limit or a lower limit of a different numerical range also described stepwise. In the numerical ranges described in the present description, the upper limit or the lower limit of one numerical range may be substituted with a value indicated in Examples.

In the present description, the term "step" not only refers to an independent step but also refers to any instance that achieves the desired purpose of that step although such a step is not clearly distinguishable from other steps.

In the present description, when a drawing is referred to describe an exemplary embodiment, the structure of that exemplary embodiment is not limited to the structure illustrated in the drawing. Moreover, the size of a member in each drawing is schematic, and the relative size relationship between the members is not limited to what is illustrated.

In the present description, each component may contain more than one corresponding substances. In the present description, when the amount of a component in a composition is referred and when there are two or more substances that correspond to that component in the composition, the amount is the total amount of the two or more substances in the composition unless otherwise noted.

In the present description, particles corresponding to each component may contain more than one types of particles. When there are more than one types of particles corresponding to one component in the composition, the particle diameter of each component is a particle diameter of a mixture of the more than one types of particles present in the composition unless otherwise noted.

In the present description, the notation "(meth)acryl" means "acryl" or "methacryl".

Method for Producing Printed Material and System for Producing Printed Material

A method for producing a printed material according to an exemplary embodiment includes a pressure-induced phase transition particle-providing step (hereinafter may be referred to as a "providing step") of providing pressure-induced phase transition particles to at least part of an outside margin portion or a portion to be folded of a recording medium; a bonding step of bonding the pressure-induced phase transition particles to the recording medium; and a pressure-bonding step of pressure-bonding a multilayer body in which multiple recording media are stacked, the recording media including the recording medium having the pressure-induced phase transition particles bonded thereon.

The pressure-induced phase transition particles contain a styrene resin containing styrene and a vinyl monomer other than styrene as polymerization components, and a (meth)acrylic acid ester resin that contains at least two (meth)acrylic acid esters as polymerization components in which the mass ratio of the (meth)acrylic acid esters relative to the total of polymerization components of the (meth)acrylic acid ester resin is 90 mass % or more.

The pressure-induced phase transition particles have at least two glass transition temperatures, and the difference between the lowest glass transition temperature and the highest glass transition temperature among the glass transition temperatures exhibited by the pressure-induced phase transition particles is 30° C. or more.

The "pressure-induced phase transition particles" refer to particles that undergo pressure-induced phase transition and specifically refer to particles that satisfy formula 1 below:

$$10° C. \leq T1-T2 \quad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa. The method for determining the temperature T1 and the temperature T2 is described below.

Hereinafter, among pressure-induced phase transition particles, those pressure-induced phase transition particles which have following properties are also referred to as "particular particles": the pressure-induced phase transition particles contain a styrene resin and a (meth)acrylic acid ester resin, the styrene resin contains styrene and a vinyl monomer other than styrene as polymerization components, the (meth)acrylic acid ester resin contains at least two (meth)acrylic acid esters as polymerization components, and a mass ratio of the (meth)acrylic acid esters is 90 mass % or more of a total of all polymerization components of the (meth)acrylic acid ester resin; and the pressure-induced phase transition particles have at least two glass transition temperatures, and a difference between the lowest glass transition temperature and the highest glass transition temperature among the glass transition temperatures of the pressure-induced phase transition particles is 30° C. or more.

In addition, a recording medium after the particular particles are provided to at least part of an outside margin portion and a portion to be folded may also be referred to as a "particle-provided recording medium".

The method for producing a printed material according to this exemplary embodiment is used to obtain a printed material in which at least part of the outside margin portion and the portion to be folded of a multilayer body obtained by stacking multiple recording media is bound. Hereinafter, a bound region in the printed material (for example, when a printed material is a booklet, this region is called a "bind margin") may also be referred to as a "bound portion".

Examples of the printed material in which at least part of the outside margin portion of the multilayer body is bound (hereinafter, this printed material may be referred to as an "outside margin portion-bound printed material") include a printed material in which one side of the outside margin portion of a multilayer body is bound (for example, a printed material 60 illustrated in FIG. 1), and a printed material in which one of four corners of the multilayer body is bound.

An example of the printed material in which at least part of the portion to be folded of the multilayer body is bound (hereinafter, this printed material may be referred to as an "folding portion-bound printed material") is a printed material in which multiple recording media each having a portion to be folded are stacked to form a multilayer body and the portions to be folded of the multilayer body are bound (for example, a printed material 40 illustrated in FIG. 2).

The method for producing a printed material according to this exemplary embodiment includes a providing step of providing particular particles to at least part of an outside margin portion and a portion to be folded of a recording medium, a bonding step, and a pressure-bonding step of pressure-bonding a multilayer body obtained by stacking multiple recording media, which include a particle-provided recording medium. Thus, through these steps, it becomes possible to produce a printed material that has a high bonding force in the bound portion compared to when particles containing a styrene resin and a (meth)acrylic acid ester resin which is a homopolymer of a (meth)acrylic acid ester are used instead of the particular particles. The reason behind this is not exactly clear, but is presumably as follows.

In general, a styrene resin and a (meth)acrylic acid ester resin have low compatibility to each other, and thus it is considered that these resins in the particles are in a phase separated state. Moreover, when the particles are pressured, the (meth)acrylic acid ester resin having a relatively low glass transition temperature is fluidized first, and this fluidization affects the styrene resin, resulting in fluidization of both resins. It is also considered that when the two resins in the particles solidify and form a resin layer as the pressure is decreased after the two resins have fluidized under pressure, a phase separated state is again formed due to their low compatibility.

It is assumed that a (meth)acrylic acid ester resin that contains at least two (meth)acrylic acid esters as polymerization components is easily fluidizable under pressure because there are at least two types of ester groups bonded to the main chain and thus the degree of molecular alignment in a solid state is low compared to a homopolymer of a (meth)acrylic acid ester. Moreover, it is assumed that when the mass ratio of the (meth)acrylic acid esters relative to the total of the polymerization components is 90 mass % or more, at least two types of ester groups are present at a high density; thus, the degree of molecular alignment in a solid state becomes lower, and thus the resin becomes easily fluidizable under pressure. Thus, it is assumed that the above-described particular particles are easily fluidizable under pressure, in other words, easily undergo pressure-induced phase transition, compared to particles in which the (meth)acrylic acid ester resin is a homopolymer of a (meth) acrylic acid ester.

In addition, it is assumed that a (meth)acrylic acid ester resin containing at least two (meth)acrylic acid esters as polymerization components, in which the mass ratio of the (meth)acrylic acid esters relative to the total of polymerization components is 90 mass % or more, has a low degree of molecular alignment during re-solidification, and, thus, a microphase separation occurs with a styrene resin. The finer the state of phase separation between the styrene resin and the (meth)acrylic acid ester resin, the higher the uniformity of the state of the bonding surface to an adherend, and the more excellent the bondability achieved by pressure bonding. Thus, it is assumed that the aforementioned particular particles have excellent bondability achieved by pressure bonding compared to particles in which the (meth)acrylic acid ester resin is a homopolymer of a (meth)acrylic acid ester.

Thus, according to the method for producing a printed material according to this exemplary embodiment in which particular particles having excellent bondability achieved by pressure bonding are used, a printed material having a high bonding force in the bound portion can be produced compared to when particles containing a styrene resin and a (meth)acrylic acid ester resin which is a homopolymer of a (meth)acrylic acid ester are used instead of the particular particles.

A method for producing a printed material of this exemplary embodiment is performed in a system for producing a printed material according to an exemplary embodiment.

The system for producing a printed material according to an exemplary embodiment includes a pressure-induced phase transition particle-providing unit that stores particular particles and provides the particular particles, which are pressure-induced phase transition particles, to at least part of an outside margin portion and a portion to be folded of a recording medium; a bonding unit that bonds the particular particles onto the recording medium, and a pressure-bonding unit that pressure-bonds a multilayer body obtained by stacking multiple recording media that include the aforementioned recording medium having the particular particles bonded thereon (in other words, a particle-provided recording medium).

Hereinafter, the steps of the method for producing a printed material according to an exemplary embodiment are described together with sections of the system for producing a printed material according to an exemplary embodiment. Pressure-induced phase transition particle-providing step and pressure-induced phase transition particle-providing unit In the providing step, the pressure-induced phase transition particle-providing unit (hereinafter may also be referred to as a "providing unit") provides particular particles to at least part of an outside margin portion and a portion to be folded of a recording medium. The particular particles are described in detail below.

A particular particle-providing section in the providing unit is not particularly limited, and may be any section capable of providing a desired amount of particular particles at a desired position in a surface of a recording medium.

Specific examples of the particular particle-providing section include a section that sprays particular particles, a section that applies particular particles, and an electrophotographic section that uses particular particles as a toner.

Examples of the recording medium used in the providing step include paper, coated paper obtained by coating the surface of paper with a resin or the like, cloths, nonwoven cloths, resin films, and resin sheets.

The recording medium may already have an image formed thereon. Generally, it is difficult to open a bound portion of a printed material having a bound portion. Thus, a recording medium used to produce a printed material may have no image in a region that will serve as a bound portion of a printed material to be produced (hereinafter, this region may also be referred to as a "particular region").

The recording medium may have a portion to be folded. The portion to be folded of a recording medium includes not only a region to be folded in the printed material production process but also a region that is already folded in the providing step. When at least a folding portion-bound printed material is to be produced, recording media having portions to be folded are used. In contrast, when an outside margin portion-bound printed material is to be produced, the recording media to be used may or may not have portions to be folded.

The position of the portion to be folded in the recording medium is set according to the shape of the printed material to be produced and is not particularly limited. The portion to be folded may be, for example, a center portion of a recording medium. One form of a recording medium having a portion to be folded in a center portion is a rectangular recording medium that has a portion to be folded extending along a line parallel to a short side at the center of a long side.

Position where Particular Particles are Provided

Particular particles are provided on at least part of the outside margin portion or the portion to be folded of the recording medium and on at least one surface of the recording medium. In other words, the particular particles are provided to at least part of the particular region of the recording medium.

When an outside margin portion-bound printed material is to be produced, at least part of the outside margin portion of the recording medium constitutes a particular region. The outside margin portion of the recording medium that that will form a particular region is a region that is bound in producing a printed material, and, for example, is a range extending 30 mm or less from an edge of the recording medium, may be a range extending 50 mm or less from an edge of the recording medium, or may be a range extending 80 mm or less from an edge of the recording medium.

FIG. 1 illustrates one example of a recording medium used in producing an outside margin portion-bound printed material. A recording medium 50 illustrated in FIG. 1 has a particular region 54 that extends along a side 52, which is one of the sides of a rectangle. In other words, this particular region 54 is positioned in one side outside margin portion of the recording medium 50. When a printed material is produced by using particle-provided recording media 56 each obtained by providing particular particles to this particular region 54, a printed material 60 formed of a multilayer body 58 having a bound portion 64 in one side of outside margin portion extending along the side 52 of the recording medium 50 is obtained.

The particular region 54 of the recording medium 50 illustrated in FIG. 1 extends over the entire side 52, but this feature is not limiting. Alternatively, a particular region may be formed in only one part of the outside margin portion extending along the side 52 (for example, in only one of the four corners of the recording medium 50).

When producing a folding portion-bound printed material, at least part of the portion to be folded of a recording medium serves as a particular region. The portion to be folded of the recording medium that will form a particular region is a region that is bound in producing a printed material, and, for example, is a range extending 30 mm or less from a folding line of the recording medium, may be a range extending 50 mm or less from a folding line of the recording medium, or may be a range extending 80 mm or less from a folding line of the recording medium.

Figure 2:
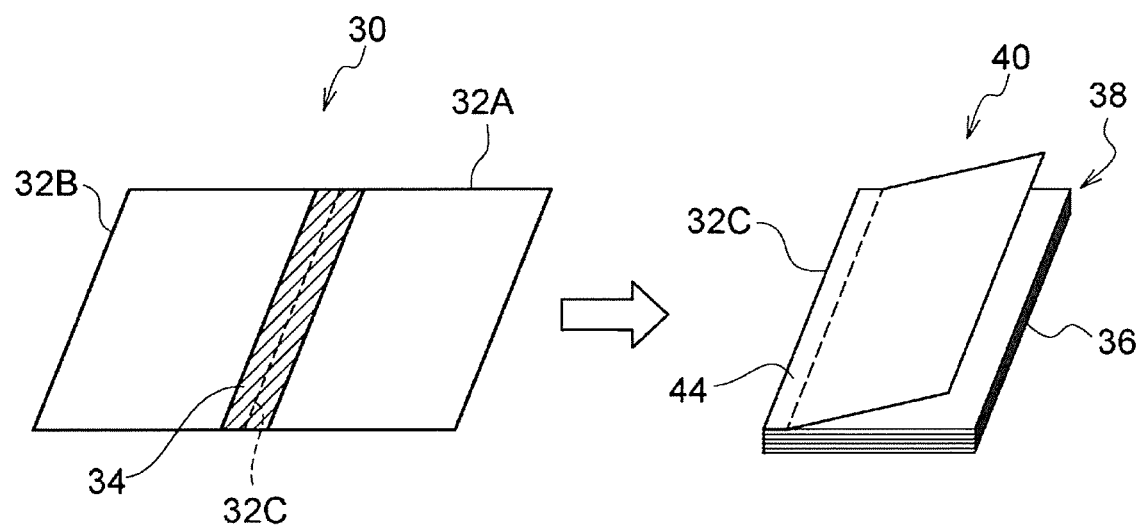
FIG. 2 is a schematic diagram illustrating another example of the recording medium and the printed material according to an exemplary embodiment.

FIG. 2 illustrates one example of a recording medium used in producing a folding portion-bound printed material. A recording medium 30 illustrated in FIG. 2 has a particular region 34 that extends along a folding line 32C parallel to a short side 32B at the center of a long side 32A of a rectangle. In other words, this particular region 34 is positioned in the center portion of the recording medium 30. When a printed material is produced by using particle-provided recording media 36 each obtained by providing particular particles to this particular region 34 and folding each recording medium 30 at this folding line 32C, a printed material 40 formed of a multilayer body 38 having a bound portion 44 that extends along the folding line 32C of the recording medium 30 is obtained.

The particular region 34 of the recording medium 30 illustrated in FIG. 2 extends over the entire folding line 32C, but this feature is not limiting. Alternatively, a particular region may be formed in only one part of the folding line 32C (for example, only in the center portion of the folding line 32C, only in two end portions of the folding line 32C, or only in the center portion and the two end portions of the folding line 32C).

The particular may be provided to a particular region in one of the surfaces of the recording medium or particular regions in both surfaces of the recording medium. In particular, when another recording medium is to be placed on top of each of the two surfaces of a recording medium to which particular particles are to be provided during formation of a multilayer body, particular particles may be provided to both surfaces of the recording medium from the viewpoint of increasing the bonding force in the bound portion.

The particular particles may be provided to only a part of the particular region. Specifically, for example, in the recording medium 50 illustrated in FIG. 1, the particular particles may be provided intermittently in a direction extending along the side 52, the particular particles in form of a pattern may be provided to the particular region 54, or the particular particles may be provided to only one portion of the particular region 54 in a direction perpendicular to the side 52. In the recording medium 30 illustrated in FIG. 2, the particular particles may be provided intermittently in a direction extending along the side the folding line 32C, the particular particles in form of a pattern may be provided to the particular region 34, or the particular particles may be provided to only one portion of the particular region 34 in a direction perpendicular to the folding line 32C.

Examples of the pattern include dots, lattices, and scattered figures (such as polygons and stars).

Provided State of Particular Particles

The provided state of the particular particles may be a state in which the particle shape remains or a state in which the particular particles are gathered to form a layer. From the viewpoint of obtaining sufficient peel strength (or bondability achieved by pressure bonding), the particular particles may form a layer.

The layer formed of the particular particles may be a continuous layer or a discontinuous layer.

From the viewpoint of obtaining sufficient bondability by sufficient pressure bonding, the amount of the provided particular particles is preferably 0.5 $g/m^2$ or more and 8.0 $g/m^2$ or less, more preferably 1.0 $g/m^2$ or more and 6.0 $g/m^2$ or less, and yet more preferably 1.5 $g/m^2$ or more and 5.0 $g/m^2$ or less.

Providing Particular Particles

As described above, the particular particles may be provided in any manner as long as particular particles are provided at an intended position, and specific examples thereof include a method that sprays particular particles, a method that applies particular particles, and an electrophotographic method that uses particular particles as a toner. The particular particles may be provided directly onto the particular region of the recording medium by dropping or roll coating. The method for providing the particular particles is not particularly limited as long as the particular particles are provided to a particular region of a recording medium.

Examples of particular particle-providing section in a unit that provides particular particles onto a recording medium include a spray-type particle-providing device that sprays particular particles, an application-type particular particle-providing device that applies particular particles, and an electrophotographic particle-providing device that uses particular particles as a toner.

The providing step that involves spraying includes, for example, a step of preparing a dispersion containing dispersed particular particles, a step of spraying the dispersion onto a recording medium, and a step of drying the dispersion sprayed onto the recording medium.

In addition, the providing unit that performs spraying is equipped with, for example, a spraying section that sprays a dispersion containing dispersed particular particles onto a recording medium and a drying section that dries the dispersion sprayed onto the recording medium.

One example of the spraying section include a sprayer. Examples of the drying section include a hot air blower, an infrared heater, and a laser irradiator.

The providing step that involves an application method includes, for example, a step of applying particular particles to a recording medium. In the application method, a coating solution containing dispersed particular particles may be used. The providing step that involves an application method using a coating solution may include a step of preparing a coating solution containing dispersed particular particles, a step of applying the coating solution to a recording medium, and a step of drying the coating solution applied to the recording medium.

The providing unit that involves an application method is, for example, equipped with an applying section that applies particular particles to a recording medium. The providing unit that involves an application method using a coating solution may be equipped with, for example, an application section that applies the coating solution to a recording medium, and a drying section that dries the applied coating solution on the recording medium.

One example of the application section is a roll.

The electrophotographic providing step includes, for example, a charging step of charging a surface of an image carrier; an electrostatic charge image forming step of forming an electrostatic charge image on the charged surface of the image carrier; a developing step of developing the electrostatic charge image on the surface of the image carrier into a particular particle region by using an electrostatic charge image developer containing the particular particles; and a transfer step of transferring the particular particle region on the surface of the image carrier onto a recording medium.

An electrophotographic providing unit includes, for example, an image carrier, a charging section that charges a surface of the image carrier, an electrostatic charge image forming section that forms an electrostatic charge image on the charged surface of the image carrier, a developing section that stores an electrostatic charge image developer containing the particular particles and develops the electrostatic charge image on the surface of the image carrier into a particular particle region by using the electrostatic charge image developer, and a transfer section that transfers the particular particle region on the surface of the image carrier onto a surface of a recording medium.

In the electrophotographic providing unit, a part that includes the developing section may be configured as a cartridge structure (in other words, a process cartridge) that is detachably attachable to the particle providing device. For example, a process cartridge detachably attachable to the particle providing device and equipped with a developing section storing an electrostatic charge image developer that contains the particular particles may be used as this process cartridge.

The electrophotographic providing method and unit may respectively use an image forming method and an image forming apparatus, and known steps and sections employed in an electrophotographic image forming method and an electrophotographic image forming apparatus may be used.

In addition, the electrophotographic providing method and unit may employ an intermediate transfer system. In the intermediate transfer system, for example, a particular particle region formed on the surface of the image carrier is temporarily transferred to the surface of the intermediate transfer body and then ultimately transferred onto a surface of a recording medium from the surface of the intermediate transfer body.

Furthermore, the electrophotographic providing method and unit may, for example, respectively include the sections and steps other than those described above, such as a step and section of cleaning the surface of the image carrier and a device equipped with a charge erasing section that erases charges by irradiating the surface of the image carrier with charge erasing light.

When a recording medium with an image thereon is used, particular particles may be provided to a recording medium already having an image thereon or an image forming step of forming an image on a recording medium and a step of providing particular particles may be continuously performed.

Examples of the method for continuously performing the image forming step and the providing step include a method that involves performing a providing step after an image forming step that uses an ink jet recording method, and a method that involves performing both an image forming step and a providing step by an electrophotographic system. A specific example is a method that involves forming a composite image on a surface of a recording medium by using both an image-forming coloring material (preferably a color ink) in the image forming step and particular particles in the providing step.

Bonding Step and Bonding Unit

In the bonding step, for example, the particular particles provided to the recording medium are heated in the bonding unit.

The section that heats the particular particles (particle heating section) is not particularly limited and may be any section that can heat the particular particles applied to the recording medium.

The section that heats the particular particles (particle heating section) may be of a contact type or a non-contact type.

A contact-type particle heating section may involve heating a member, such as a roll, a belt, or a pad, and causing the heated member to contact the particular particles, for example.

A non-contact-type particle heating section may involve passing a recording medium with the particular particles applied thereto through a zone heated with a heater, an oven, or the like, or may involve heating the particular particles with illuminating light from a halogen lamp, a xenon lamp, or the like.

In particular, from the viewpoint of heating the particular particles and suppressing movement, detachment, etc., of the particular particles, a contact-type particle heating section may be used in the bonding step.

In other words, the particle heating section may be a contact-type particle heating section.

Heating Particular Particles by Contact-Type Method

When heating particular particles by a contact-type method, the set temperature of the member (also referred to as a contact member) contacting the particular particles may be any temperature at which the particular particles can be plasticized. However, from the viewpoint of efficiency of heating the particular particles, etc., the set temperature is, for example, preferably 120° C. or more and 250° C. or less, more preferably 130° C. or more and 200° C. or less, and yet more preferably 150° C. or more and 180° C. or less.

Here, the set temperature of the contact member refers to the target value of the surface temperature of the contact member contacting the particular particles.

The contact member may be any member that has a surface heated to the aforementioned set temperature, and examples thereof include a roll, a belt, and a pad.

The bonding step may be a step of heating and pressurizing the particular particles.

When the particular particles are heated and pressurized simultaneously, the particular particle-applied surface (for example, the surface of a layer formed of the particular particles) can be made flat and smooth.

The pressure applied to the particular particles in the bonding step is, for example, a pressure applied by an electrophotographic fixing section.

Examples of the section that heats and pressurizes the particular particles (this section is also referred to as a heating and pressurizing member) are as follows:

A heating and pressurizing roll pair constituted by two contacting rolls at least one of which applies heat and between which a recording medium with the particular particles thereon is passed to be heated and pressurized; a heating and pressurizing member constituted by a roll and a belt in contact with each other, in which at least one of the roll and the belt applies heat, and a recording medium with the particular particles thereon is passed between the roll and the belt to be heated and pressurized; and a heating and pressurizing belt pair constituted by two contacting belts at least one of which applies heat and between which a recording medium with the particular particles thereon is passed to be heated and pressurized.

Pressure-Bonding Step and Pressure-Bonding Unit

In the pressure-bonding step, a multilayer body obtained by stacking multiple recording media including a recording medium having particular particles bonded thereon (in other words, a particle-provided recording medium) are pressure-bonded in a pressure bonding unit.

The number of recording media constituting the multilayer body is at least 2 and may be appropriately set according to a printed material to be produced. The number of recording media is, for example, 2 or more and 100 or less, is preferably 2 or more and 50 or less, and more preferably 2 or more and 30 or less from the viewpoint of obtaining a bonding force in the bound portion.

The multilayer body includes at least a particle-provided recording medium, all of the recording media constituting the multilayer body may be particle-provided recording media, all of the recording media except for at least one of a front cover and a back cover may be particle-provided recording media, or particle-provided recording media and recording media not provided with particular particles may be alternately stacked.

The multilayer body may be obtained by stacking recording media by aligning the particular regions of the recording media. For example, when a particular region is at one side of outside margin portion of a recording medium, the multilayer body may include recording media stacked so that the one side of outside margin portions are aligned. When a particular region is in the portion to be folded of a recording medium, the multilayer body may include recording media stacked so that the positions of the folding lines are aligned. A multilayer body constituted by recording media each having a particular region in a portion to be folded may be obtained by stacking recording media in a spread state or by stacking recording media in a folded state folded at the folding line.

Pressurizing of the multilayer body is to be performed at least on a region that will form a bound portion of a printed material, and may be performed on only a region that will form the bound portion or on the entirety of the multilayer body.

The section that pressurizes the multilayer body (multilayer body pressurizing section) may be any section that can pressurize the multilayer body in the thickness direction, and may be a section that allows the multilayer body to pass between a pair of rolls or a section that pressurizes the multilayer body by using a pressing machine, a sealer, a stapler, or the like.

The multilayer body pressurizing section may be a commercially available device. Specific examples thereof include PRESSLE LEADA, PRESSLE CORE, and PRESSLE Bee produced by Toppan Forms Co., Ltd., and PS-500H, PS-500, EX-4100WI, EX-4100W, EX-4100/4150, and PS-100 produced by DUPLO SEIKO CORPORATION.

The pressure applied in the thickness direction of the multilayer body (hereinafter this pressure may be referred to as the "pressure bonding pressure") in the pressure-bonding step is preferably 60 MPa or more and 150 MPa or less, more preferably 70 MPa or more and 130 MPa or less, and yet more preferably 90 MPa or more and 110 MPa or less in terms of maximum pressure.

When the pressure bonding pressure is 60 MPa or more, sufficient bondability is easily obtained by sufficient pressure bonding. At a pressure bonding pressure of 150 MPa or less, breaking, deformation, etc., of the recording medium during pressurizing are easily suppressed.

The pressure bonding pressure is measured by a commercially available pressure measuring film. A specific example of the pressure measuring film is a pressure measuring film, PRESCALE produced by FUJIFILM Corporation. Here, the "maximum pressure" is the maximum value observed as the pressure applied to the multilayer body by the multilayer body pressurizing section is changed.

The pressure-bonding step may be performed without heating or with heating.

In other words, the multilayer body pressurizing section may be free of a heating section and may pressurize the multilayer body without heating, or may be equipped with a heating section and may heat the multilayer body while pressurizing.

The method for producing a printed material according to this exemplary embodiment may include additional steps in addition to the aforementioned providing step, bonding step, and pressure-bonding step.

An example of the additional steps is a step of cutting a recording medium after the bonding step or a multilayer body after the pressure-bonding step into a desired size. One example of production system and method In the description below, one example of a system for producing a printed material according to an exemplary embodiment is described, and a method for producing a printed material according to an exemplary embodiment is described; however, the exemplary embodiments are not limited by the description below.

Figure 3:
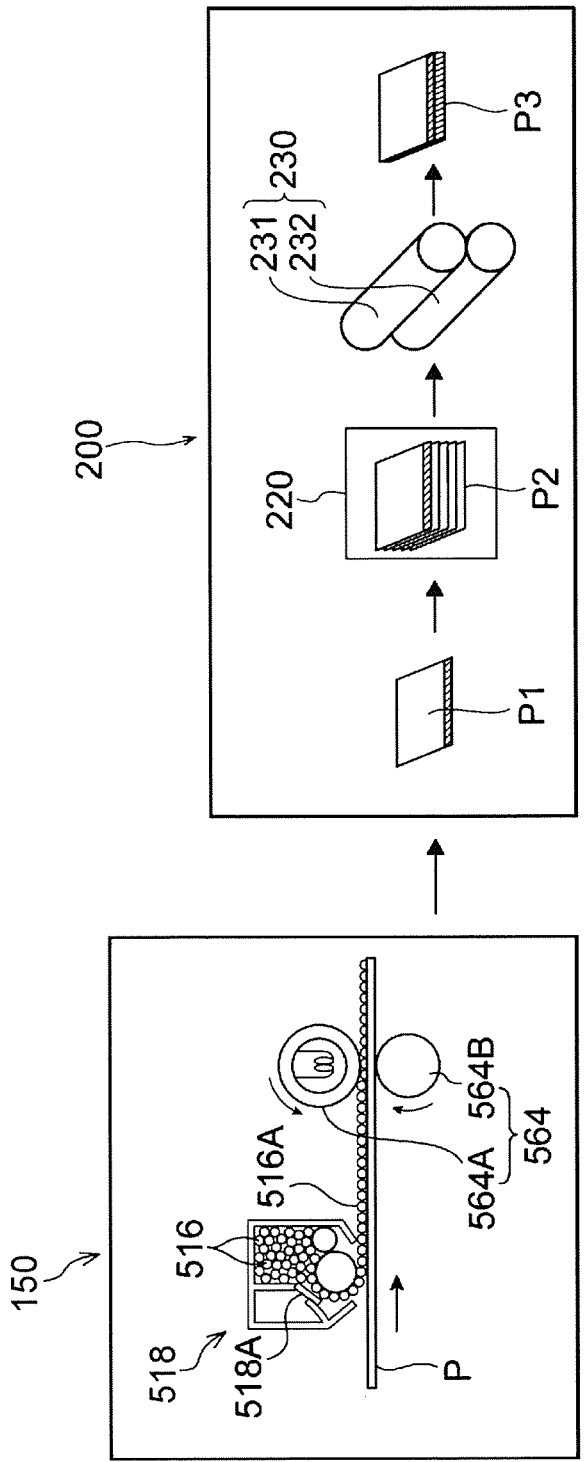
FIG. 3 is a schematic diagram illustrating one example of a system for producing a printed material according to an exemplary embodiment.

FIG. 3 is a schematic diagram illustrating one example of a system for producing a printed material according to an exemplary embodiment. The system for producing a printed material illustrated in FIG. 3 includes a placing section 150 that has a providing unit that stores particular particles and provides the particular particles onto at least part of the outside margin portion and the portion to be folded of the recording medium and a bonding unit that bonds the particular particles onto the recording medium; and a pressure bonding section 200 disposed downstream of the placing section 150. The pressure bonding section 200 includes a pressure bonding unit that pressure-bonds a multilayer body obtained by stacking multiple recording media including a recording medium having the particular particles bonded thereon. The arrow indicates the direction in which the recording medium is conveyed.

The placing section 150 is a device that places the particular particles on a recording medium P by an application method. The recording medium P has, for example, an image formed on one or both surfaces in advance.

The placing section 150 has a particle providing device 518 that provides particular particles 516 to the surface of the recording medium P. The particle providing device 518 is one example of the providing unit that provides the particular particles to a position corresponding to a particular region in the recording medium.

The particle providing device 518 supplies particular particles 516 to the surface of the recording medium P and forms a particular particle region 516A in the surface of the recording medium P.

The particle providing device 518 has a supply roll 518A in a portion opposing the recording medium P, and supplies the particular particles 516 only to the corresponding application region (in other words, the particular region). In the particle providing device 518, the particular particles 516 are supplied to the supply roll 518A to adjust the amount of the particular particles 516 supplied to the supply roll 518A (in other words, the thickness of the layer formed by supplying the particular particles 516 onto the recording medium P).

The placing section 150 is further equipped with a recording medium storing unit (not illustrated) that stores the recording medium P, a conveying unit (not illustrated) that conveys the recording medium P stored in the recording medium storing unit, a bonding device 564 that causes the particular particles 516 applied to the recording medium P to bond to the recording medium P, and a recording medium discharging unit (not illustrated) that discharges the recording medium P having the particular particles 516 bonded thereon by the bonding device 564.

The bonding device 564 includes a heating roll 564A having a built-in heating source, and a pressurizing roll 564B that is arranged to oppose the heating roll 564A.

The operation of the placing section 150 placing the particular particles on the recording medium P will now be described.

When the recording medium P is conveyed from the recording medium storing unit by the conveying unit and is delivered to the position of the particle providing device 518, the particular particles 516 are provided onto the recording medium P by the particle providing device 518 so as to form a particular particle region 516A.

The recording medium P having the particular particle region 516A formed thereon is subsequently conveyed to the bonding device 564 (one example of the bonding unit). The pressure applied to the recording medium P from the bonding device 564 may be low compared to the pressure applied to the recording medium P from the pressurizing device 230, and, specifically, may be 0.2 MPa or more and 1 MPa or less. The surface temperature of the recording medium P when heated by the heating roll 564A of the bonding device 564 is preferably 150° C. or more and 220° C. or less, more preferably 155° C. or more and 210° C. or less, and yet more preferably 160° C. or more and 200° C. or less.

The recording medium P passes the placing section 150 and thus becomes a particle-provided recording medium P1 in which the particular particles are provided to the particular region in the outside margin portion. The particle-provided recording medium P1 is then conveyed toward the pressure-bonding section 200.

In the system for producing a printed material according to this exemplary embodiment, the placing section 150 and the pressure-bonding section 200 may be close to each other or distant from each other. When the placing section 150 and the pressure-bonding section 200 are distant from each other, the placing section 150 and the pressure-bonding section 200 are, for example, linked via a conveying section (for example, a belt conveyor) that conveys the particle-provided recording medium P1.

The pressure-bonding section 200 is equipped with a multilayer body forming device 220 and a pressurizing device 230, and pressurizes a multilayer body P2 obtained by stacking particle-provided recording media P1.

The multilayer body forming device 220 prepares the multilayer body P2 by stacking multiple particle-provided recording media P1, which have particular particles provided onto the particular region in the outside margin portion and which have passed the device. In the multilayer body P2, the particular regions of the respective recording media are on top of each other.

The multilayer body P2 that has exited the multilayer body forming device 220 is conveyed toward the pressurizing device 230.

The pressurizing device 230 is equipped with a pair of pressurizing members (in other words, pressurizing rolls 231 and 232). The pressurizing roll 231 and the pressurizing roll 232 contact and push each other at their outer peripheral surfaces to apply pressure onto the passing multilayer body P2. The pair of pressurizing members in the pressurizing device 230 is not limited to the combination of pressurizing rolls and may be a combination of a pressurizing roll and a pressurizing belt or a combination of a pressurizing belt and a pressurizing belt.

When a pressure is applied to the multilayer body P2 passing the pressurizing device 230, the particular particles on the multilayer body P2 are fluidized under pressure and exhibit bondability. The pressure that the pressurizing device 230 applies to the multilayer body P2 is preferably 3 MPa or more and 300 MPa or less, more preferably 10 MPa or more and 200 MPa or less, and yet more preferably 30 MPa or more and 150 MPa or less.

The pressurizing device 230 may have therein a heating source (for example, a halogen heater) for heating the multilayer body P2, but this is optional. When the pressurizing device 230 has a heating source inside, the surface temperature of the multilayer body P2 heated by the heating source is preferably 30° C. or more and 120° C. or less, more preferably 40° C. or more and 100° C. or less, and yet more preferably 50° C. or more and 90° C. or less. The pressurizing device 230 may have no heating source inside, and this does not exclude the case in which the temperature inside the pressurizing device 230 increases to a temperature equal to or more than the environment temperature due to heat from a motor in the pressurizing device 230 or the like.

As the multilayer body P2 passes the pressurizing device 230, the surfaces that are on top of each other bond with each other via the fluidized particular particles, and a printed material P3 is obtained. In the printed material P3, the particular regions of the recording media are bonded to one another so that the position corresponding to the particular region constitutes a bound portion.

The finished printed material P3 is discharged from the pressurizing device 230.

In the system for producing a printed material according to this exemplary embodiment, the multilayer body forming device 220 and the pressurizing device 230 may be close to each other or distant from each other. When the multilayer body forming device 220 and the pressurizing device 230 are distant from each other, the multilayer body forming device 220 and the pressurizing device 230 are, for example, linked via a conveying section (for example, a belt conveyor) that conveys the multilayer body P2.

The system for producing a printed material according to this exemplary embodiment may be equipped with a cutting section that cuts the recording medium into a predetermined size. Examples of the cutting section include a cutting section that is disposed between the placing section 150 and the pressure-bonding section 200 and cuts off a part of the particle-provided recording medium P1; a cutting section that is disposed between the multilayer body forming device 220 and the pressurizing device 230 and cuts off a part of the multilayer body P2; and a cutting section that is disposed downstream of the pressure-bonding section 200 and cuts off a part of the printed material P3.

The system for producing a printed material according to this exemplary embodiment is not limited to a single-sheet type. The apparatus for producing a printed material according to this exemplary embodiment may be of a type that performs a placing step and a pressure-bonding step on a long recording medium to form a long printed material, and then cuts the long printed material into a predetermined size.

Figure 4:
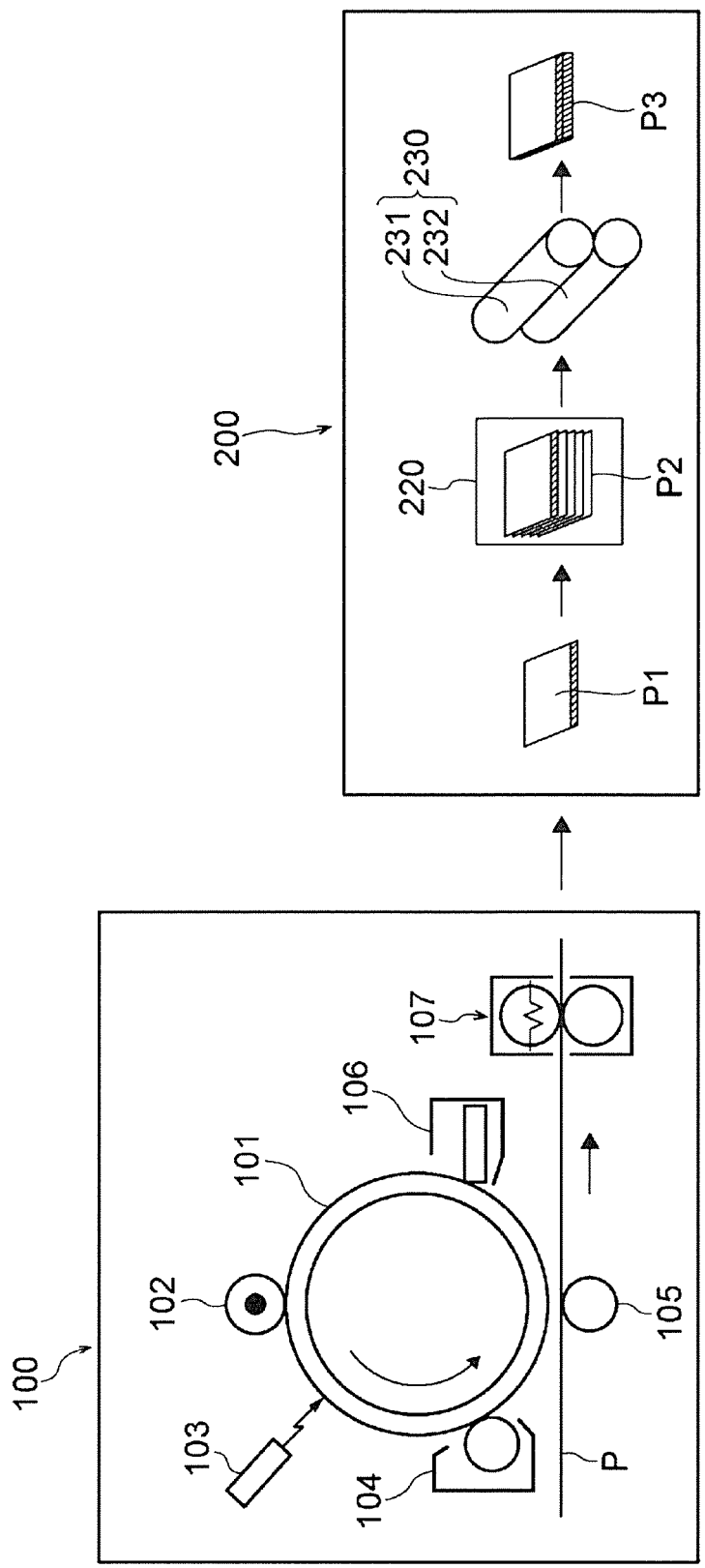
FIG. 4 is a schematic diagram illustrating another example of a system for producing a printed material according to an exemplary embodiment.

FIG. 4 is a schematic diagram illustrating another example of a system for producing a printed material according to an exemplary embodiment. The system for producing a printed material illustrated in FIG. 4 includes a placing section 100 that has a providing unit that stores particular particles and provides the particular particles onto at least part of the outside margin portion or the portion to be folded of the recording medium and a bonding unit that bonds the particular particles onto the recording medium; and a pressure bonding section 200 disposed downstream of the placing section 100. The pressure bonding section 200 includes a pressure bonding unit that pressure-bonds a multilayer body obtained by stacking multiple recording media including a recording medium having the particular particles bonded thereon. The arrow indicates the direction in which the photoreceptor rotates or the recording medium is conveyed.

The placing section 100 is a direct transfer type device that places the particular particles on a recording medium P by an electrophotographic method using a developer containing the particular particles. The recording medium P has, for example, an image formed on one or both surfaces in advance.

The placing section 100 includes a photoreceptor 101. A charging roll (one example of the charging section) 102 that charges the surface of the photoreceptor 101, an exposing device (one example of the electrostatic charge image forming section) 103 that forms an electrostatic charge image by exposing the charged surface of the photoreceptor 101 with a laser beam, a developing device (one example of the developing section) 104 that develops the electrostatic charge image into a particular particle region by supplying the particular particles to the electrostatic charge image, a transfer roll (one example of the transfer section) 105 that transfers the developed particular particle region onto a recording medium P, and a photoreceptor cleaning device (one example of the cleaning section) 106 that removes the particular particles remaining on the surface of the photoreceptor 101 after the transfer are provided in that order around the photoreceptor 101.

The operation of the placing section 100 placing the particular particles on the recording medium P will now be described.

First, the surface of the photoreceptor 101 is charged by the charging roll 102. The developing device 103 applies a laser beam onto the charged surface of the photoreceptor 101 in accordance to image data sent from a controller (not illustrated). As a result, an electrostatic charge image of a particular particle placement pattern is formed on the surface of the photoreceptor 101.

The electrostatic charge image formed on the photoreceptor 101 is rotated to a developing position as the photoreceptor 101 is run. The electrostatic charge image on the photoreceptor 101 at the development position is developed by the developing device 104 and visualized into a particular particle region.

A developer that contains at least the particular particles and a carrier is stored in the developing device 104. The particular particles are frictionally charged as they are stirred with a carrier in the developing device 104, and are retained on the developer roll. As the surface of the photoreceptor 101 passes the developing device 104, the particular particles electrostatically adhere to the electrostatic charge image on the surface of the photoreceptor 101, and the electrostatic charge image is thereby developed with the particular particles into a particular particle region. The photoreceptor 101 having the particular particle region thereon is continuously run, and the particular particle region on the photoreceptor 101 is conveyed to a transfer position.

After the particular particle region on the photoreceptor 101 is conveyed to the transfer position, a transfer bias is applied to the transfer roll 105. An electrostatic force working from the photoreceptor 101 toward the transfer roll 105 works on the particular particle region, and the particular particle region on the photoreceptor 101 is transferred onto the recording medium P.

The particular particles remaining on the photoreceptor 101 are removed by the photoreceptor cleaning device 106 and recovered. The photoreceptor cleaning device 106 is, for example, a cleaning blade or a cleaning brush. From the viewpoint of suppressing the phenomenon in which the particular particles of the exemplary embodiment remaining on the surface of the photoreceptor fluidize under a pressure and attach to the surface of the photoreceptor while forming a film, the photoreceptor cleaning device 106 may be a cleaning brush.

The recording medium P having the particular particle region transferred thereon is conveyed to the bonding device (one example of the bonding unit) 107. The bonding device 107 is, for example, a pair of bonding members (roll/roll or belt/roll). The pressure applied to the recording medium P from the bonding device 107 may be low compared to the pressure applied to the recording medium P from the pressurizing device 230, and, specifically, may be 0.2 MPa or more and 1 MPa or less.

The bonding device 107 may optionally have therein a heating source (for example, a halogen heater) for heating the recording medium P. When the bonding device 107 has a heating source inside, the surface temperature of the recording medium P heated by the heating source is preferably 150° C. or more and 220° C. or less, more preferably 155° C. or more and 210° C. or less, and yet more preferably 160° C. or more and 200° C. or less. The bonding device 107 may have no heating source inside, and this does not exclude that the temperature inside the bonding device 107 increases to a temperature equal to or more than the environment temperature due to heat from a motor in the placing section 100 or the like.

The recording medium P passes the placing section 100 and thus becomes a particle-provided recording medium P1 in which the particular particles are provided to the particular region in the outside margin portion. The particle-provided recording medium P1 is then conveyed toward the pressure-bonding section 200. A pressure-bonding section similar to the pressure-bonding section 200 in the system for producing a printed material illustrated in FIG. 3 is used as the pressure-bonding section 200 of the system for producing a printed material illustrated in FIG. 4.

In the system for producing a printed material according to this exemplary embodiment, the placing section 100 and the pressure-bonding section 200 may be close to each other or distant from each other. When the placing section 100 and the pressure-bonding section 200 are distant from each other, the placing section 100 and the pressure-bonding section 200 are, for example, linked via a conveying section (for example, a belt conveyor) that conveys the particle-provided recording medium P1.

The system for producing a printed material according to this exemplary embodiment may be equipped with a cutting section that cuts the recording medium into a predetermined size. Examples of the cutting section include a cutting section that is disposed between the placing section 100 and the pressure-bonding section 200 and cuts off a part of the particle-provided recording medium P1; a cutting section that is disposed between the multilayer body forming device 220 and the pressurizing device 230 and cuts off a part of the multilayer body P2; and a cutting section that is disposed downstream of the pressure-bonding section 200 and cuts off a part of the printed material P3.

The system for producing a printed material according to this exemplary embodiment is not limited to a single-sheet type. The apparatus for producing a printed material according to this exemplary embodiment may be of a type that performs a placing step and a pressure-bonding step on a long recording medium to form a long printed material, and then cuts the long printed material into a predetermined size.

The system for producing a printed material according to this exemplary embodiment may further include a color image forming section that forms a color image on a recording medium by using a coloring material. Examples of the color image forming section include a section that forms a color ink image on a recording medium by an ink jet method using a color ink, and a section that forms a color toner image on a recording medium by an electrophotographic method using a color electrostatic charge image developer.

The color image forming section that uses an ink jet method is equipped with, for example, a liquid ejection head that ejects a liquid that serves as an ink. The color image forming section that uses an ink jet method may be of a direct ejection type in which a liquid is directly ejected from a liquid ejection head onto a recording medium, or of an intermediate transfer type in which a liquid ejection head ejects a liquid onto an intermediate transfer body and then the liquid ejected onto the intermediate transfer body is transferred onto a recording medium.

The color image forming section that uses an electrophotographic method is equipped with, for example, a photoreceptor, a charging section that charges a surface of the photoreceptor, an electrostatic charge image forming section that forms an electrostatic charge image on the charged surface of the photoreceptor, a developing section that stores a color electrostatic charge image developer and develops the electrostatic charge image on the surface of the photoreceptor into a color toner image by using the color electrostatic charge image developer, a transfer section that transfers the color toner image on the surface of the photoreceptor onto a surface of a recording medium, and a thermal fixing section that thermally fixes the color toner image transferred onto the surface of the recording medium.

The aforementioned system for producing a printed material is used to implement the method for producing a printed material of the exemplary embodiment, the method further including the color image forming step of forming a color image on the recording medium by using a color material. Specific examples of the color image forming step include a step of forming a color ink image on a recording medium by an inkjet method using a color ink, and a step of forming a color toner image by an electrophotographic method using a color electrostatic charge image developer.

The color image forming step that uses an ink jet method includes, for example, a liquid ejecting step of ejecting a liquid that serves as an ink. The color image forming step that uses an ink jet method may involve a direct ejection process in which a liquid is directly ejected onto a recording medium, or an intermediate transfer process in which a liquid is ejected onto an intermediate transfer body and then the liquid ejected onto the intermediate transfer body is transferred onto a recording medium.

The color image forming step that uses an electrophotographic method includes, for example, a charging step of charging a surface of a photoreceptor, an electrostatic charge image forming step of forming an electrostatic charge image on the charged surface of the photoreceptor, a developing step of developing the electrostatic charge image on the surface of the photoreceptor into a color toner image by using a color electrostatic charge image developer, a transfer step of transferring the color toner image on the surface of the photoreceptor onto a surface of a recording medium, and a thermal fixing step of thermally fixing the color toner image transferred onto the surface of the recording medium.

Examples of the color image forming section included in the system for producing a printed material according to this exemplary embodiment include a direct type device that directly forms a color image on a recording medium; an intermediate transfer type device that forms a color image on a surface of an intermediate transfer body and transfers the color image on the surface of the intermediate transfer body onto a recording medium; a device equipped with a cleaning section for cleaning a surface of a photoreceptor after transfer of a color image and before charging when the color image is a color toner image; and a device equipped with a charge erasing section that erases charges by irradiating the surface of the photoreceptor with charge-erasing light after transfer of a color image and before charging when the color image is a color toner image. When the color image forming section that uses an electrophotographic method is an intermediate transfer type device, the transfer section has, for example, an intermediate transfer body having a surface to which a color toner image is transferred, a first transfer section that transfers (first transfer) the color toner image on the surface of the photoreceptor onto a surface of the intermediate transfer body, and a second transfer section that transfers (second transfer) the color toner image on the surface of the intermediate transfer body onto a surface of a recording medium.

In the system for producing a printed material according to this exemplary embodiment, when the particular particle placing section and the color image forming section both employ an intermediate transfer method, the placing section and the color image forming section may share the intermediate transfer body and the transfer section.

In the system for producing a printed material according to this exemplary embodiment, when the color image forming section has a bonding device that bonds a coloring material to a recording medium, the bonding device of the particular particle placing section and the bonding device of the color image forming section may be one shared bonding device.

Other examples of the system for producing a printed material according to the present exemplary embodiment equipped with a color image forming section are described below, but these examples are not limiting. Only relevant parts illustrated in the drawing are described in the description below, and descriptions of other parts are omitted.

Figure 5:
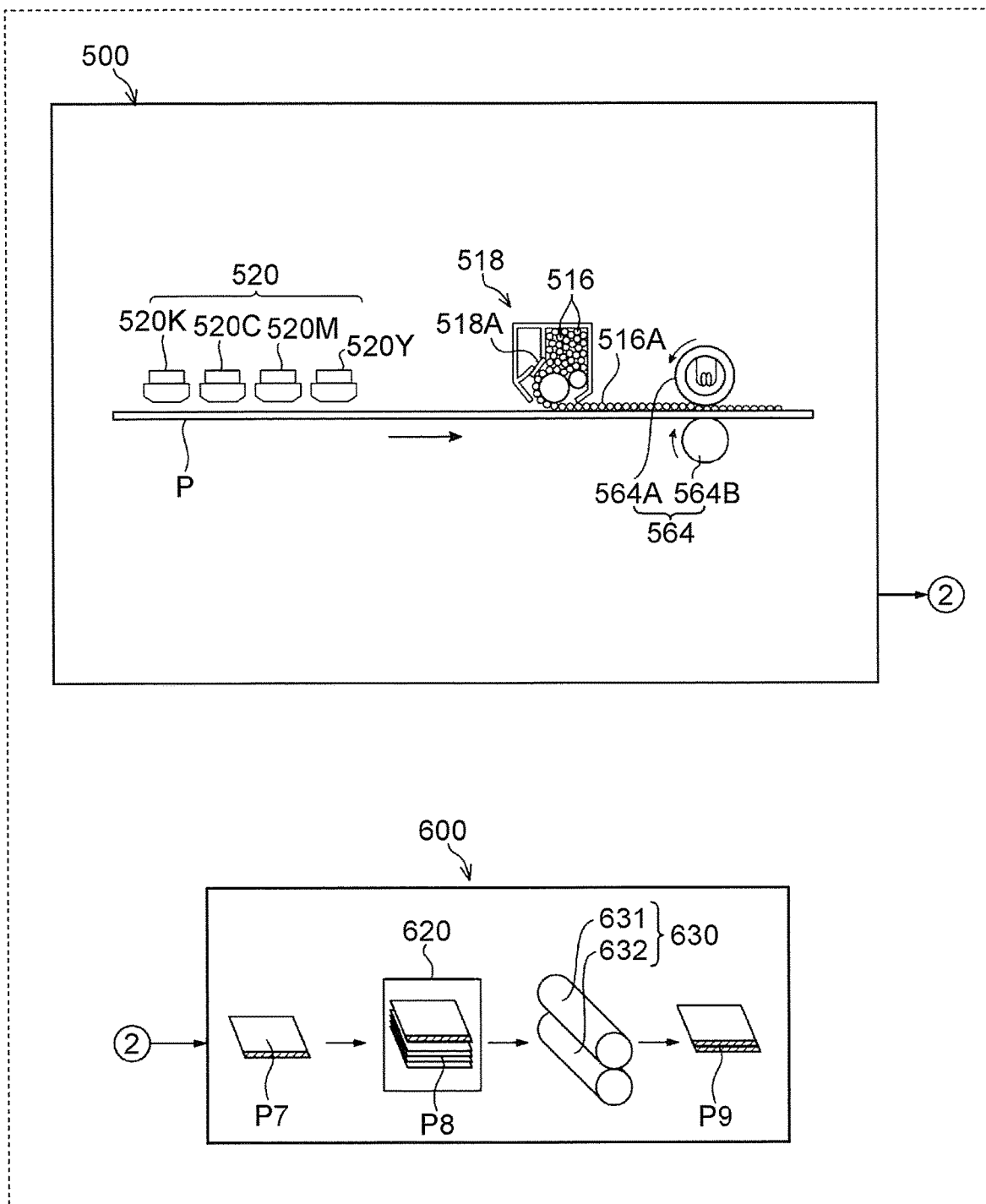
FIG. 5 is a schematic diagram illustrating another example of a system for producing a printed material according to an exemplary embodiment.

FIG. 5 is a schematic diagram illustrating another example of a system for producing a printed material according to an exemplary embodiment. The system for producing a printed material illustrated in FIG. 5 is equipped with a printing section 500 that forms a color image and provides particular particles onto a recording medium by an ink jet method, and a pressure-bonding section 600 disposed downstream of the printing section 500.

The printing section 500 is equipped with an ink jet recording head 520, which is one example of color image color image forming section, that ejects ink droplets onto a recording medium P to form a color image.

When viewed from the ink jet recording head 520, a particle providing device 518 that provides particular particles 516 to a surface of a recording medium P is disposed on the downstream in the recording medium P conveying direction (the arrow direction in the drawing). The particle providing apparatus 518 is one example of a providing unit that provides particular particles to a position corresponding to the particular region in the recording medium.

The printing section 500 includes a recording medium storing unit (not illustrated) that stores the recording medium P, a conveying unit (not illustrated) that conveys the recording medium P stored in the recording medium storing unit, a bonding device 564 that causes ink droplets and particular particles 516 provided to the recording medium P to bond with the recording medium P, and a recording medium discharging unit (not illustrated) that discharges the recording medium P having the ink droplets and the particular particles 516 bonded thereon by the bonding device 564.

The bonding device 564 includes a heating roll 564A having a built-in heating source, and a pressurizing roll 564B that is arranged to oppose the heating roll 564A.

The particle providing device 518 supplies particular particles 516 to the surface of the recording medium P and forms a particular particle region 516A in the surface of the recording medium P.

The particle providing device 518 has a supply roll 518A in a portion opposing the recording medium P, and supplies the particular particles 516 only to the corresponding application region (in other words, the particular region in the recording medium P).

The particular particles 516 are supplied to the supply roll 518A to adjust the amount of the particular particles 516 provided to the recording medium P (in other words, the thickness of the particular particle region 516A having a layer shape on the recording medium P).

The ink jet recording head 520 includes an ink jet recording head 520Y that ejects yellow ink droplets from nozzles, an ink jet recording head 520M that ejects magenta ink droplets from nozzles, an ink jet recording head 520C that ejects cyan ink droplets from nozzles, and an ink jet recording head 520K that ejects black ink droplets from nozzles. The ink jet recording head 520 is driven by a piezoelectric system, a thermal system, or the like.

The ink jet recording head 520 may be a recording head that has a recording width equal to or larger than a region to be recorded and records an image by ejecting droplets onto a recording medium P without moving in a direction intersecting the recording medium P-conveying direction, or may be a recording head that records an image by ejecting droplets onto a recording medium P while moving in a direction intersecting the recording medium P-conveying direction.

The ink ejected from the ink jet recording head 520 may be an aqueous ink or an oil-based ink, and an aqueous ink may be used from the viewpoint of environment. The aqueous ink contains a recording material such as a coloring material and an ink solvent (for example, water or a water-soluble organic solvent). If needed, the aqueous ink may contain other additives.

In the printing section 500, first, the recording medium P is conveyed from the recording medium storing unit by the conveying unit and is delivered to the position of the ink jet recording head 520, and then ink droplets of respective colors are provided onto the recording medium P by the ink jet recording head 520 to form a color image. Next, the recording medium P having the color image formed thereon is conveyed by the conveying unit and is delivered to the position of the particle providing device 518, and then the particular particles 516 are provided to the recording medium P by the particle providing device 518 so as to form a particular particle region 516A.

The recording medium P having the color image and the particular particle region 516A formed thereon is subsequently conveyed to the bonding device 564 (one example of the bonding unit). The pressure applied to the recording medium P from the bonding device 564 may be low compared to the pressure applied to the recording medium P from the pressurizing device 230, and, specifically, may be 0.2 MPa or more and 1 MPa or less. The surface temperature of the recording medium P when heated by the heating roll 564A of the bonding device 564 is preferably 150° C. or more and 220° C. or less, more preferably 155° C. or more and 210° C. or less, and yet more preferably 160° C. or more and 200° C. or less.

As described above, as the recording medium P passes the printing section 500, the recording medium P turns into a particle-provided recording medium P7 on which a color image is formed and particular particles are provided to the particular region constituting a part of the outside margin portion.

The particle-provided recording medium P7 is then conveyed toward the pressure-bonding section 600.

As with the pressure bonding section 200 illustrated in FIG. 3, the pressure-bonding section 600 is equipped with a multilayer body forming device 620 and a pressurizing device 630, and pressurizes a multilayer body P8 obtained by stacking particle-provided recording media P7.

The multilayer body P8 that has exited the multilayer body forming device 620 passes between the pressurizing rolls 631 and 632 of the pressurizing device 630 so that the surfaces that are on top of each other are bonded to each other via the fluidized particular particles, and a printed material P9 is obtained. In the printed material P9, the particular regions of the recording media are bonded to one another so that the position corresponding to the particular region constitutes a bound portion.

Subsequently, the finished printed material P9 is discharged from the pressurizing device 630.

FIG. 6 is a schematic diagram illustrating one example of a system for producing a printed material according to an exemplary embodiment. The system for producing a printed material illustrated in FIG. 6 is equipped with a printing section 300 that forms color images on and applies particular particles to a recording medium, and a pressure-bonding section 400 disposed downstream of the printing section 300.

The printing section 300 is a five-stand-tandem intermediate transfer-type printing section.

The printing section 300 is equipped with a unit 10T that provides the particular particles (T), and units 10Y, 10M, 10C, and 10K that respectively form yellow (Y), magenta (M), cyan (C), and black (K) images. The unit 10T is a particle providing section (in other words, the providing unit) that provides the particular particles onto a recording medium P by using a developer that contains the particular particles. Each of the units 10Y, 10M, 10C, and 10K is a section that forms a color image on f recording medium P by using a developer that contains a color toner. The units 10T, 10Y, 10M, 10C, and 10K employ an electrophotographic system.

The units 10T, 10Y, 10M, 10C, and 10K are disposed side by side with spaces therebetween in the horizontal direction. The units 10T, 10Y, 10M, 10C, and 10K may each be a process cartridge detachably attachable to the printing section 300.

An intermediate transfer belt (one example of the intermediate transfer body) 20 extends below and throughout the units 10T, 10Y, 10M, 10C, and 10K. The intermediate transfer belt 20 is wound around a driving roll 22, a supporting roll 23, and a counter roll 24 that are in contact with the inner surface of the intermediate transfer belt 20, and runs in a direction from the unit 10T to the unit 10K. An intermediate transfer body cleaning device 21 is installed on the image carrying surface side of the intermediate transfer belt 20 so as to face the driving roll 22.

The units 10T, 10Y, 10M, 10C, and 10K are respectively equipped with developing devices (examples of the developing sections) 4T, 4Y, 4M, 4C, and 4K. Particular particles, a yellow toner, a magenta toner, a cyan toner, and a black toner contained in cartridges 8T, 8Y, 8M, 8C, and 8K are respectively supplied to the developing devices 4T, 4Y, 4M, 4C, and 4K.

Since the units 10T, 10Y, 10M, 10C, and 10K are identical in structure and in operation, the unit 10T that provides the particular particles to the recording medium is described as a representative example.

The unit 10T has a photoreceptor (an example of the image carrier) 1T. A charging roll (one example of the charging section) 2T that charges the surface of the photoreceptor 1T, an exposing device (one example of the electrostatic charge image forming section) 3T that forms an electrostatic charge image by exposing the charged surface of the photoreceptor 1T with a laser beam, a developing device (one example of the developing section) 4T that develops the electrostatic charge image into a particular particle region by supplying the particular particles to the electrostatic charge image, a first transfer roll (one example of the first transfer section) 5T that transfers the developed particular particle region onto the intermediate transfer belt 20, and a photoreceptor cleaning device (one example of the cleaning section) 6T that removes the particular particles remaining on the surface of the photoreceptor 1T after the first transfer are provided in that order around the photoreceptor 1T. The first transfer roll 5T is disposed on the inner side of the intermediate transfer belt 20 and is positioned to face the photoreceptor 1T.

In the description below, operation of applying the particular particles to the recording medium P and forming color images is described by describing the operation of the unit 10T as an example.

First, the surface of the photoreceptor 1T is charged by the charging roll 2T. The developing device 3T applies a laser beam onto the charged surface of the photoreceptor 1T in accordance to image data sent from a controller (not illustrated). As a result, an electrostatic charge image, which is the region where the particular particles are to be applied, is formed on the surface of the photoreceptor 1T.

The electrostatic charge image formed on the photoreceptor 1T is rotated to a developing position as the photoreceptor 1T is run. The electrostatic charge image on the photoreceptor 1T is developed by the developing device 4T into a particular particle region.

A developer that contains at least the particular particles and a carrier is stored in the developing device 4T. The particular particles are frictionally charged as they are stirred with the carrier in the developing device 4T, and are carried on the developer roll. As the surface of the photoreceptor 1T passes the developing device 4T, the particular particles electrostatically adhere to the electrostatic charge image on the surface of the photoreceptor 1T, and the electrostatic charge image is thereby developed with the particular particles into a particular particle region. The photoreceptor 1T having a particular particle region thereon is continuously run, and the particular particle region on the photoreceptor 1T is conveyed to a first transfer position.

After the particular particle region on the photoreceptor 1T is conveyed to the first transfer position, a first transfer bias is applied to the first transfer roll 5T. An electrostatic force working from the photoreceptor 1T toward the first transfer roll 5T also works on the particular particle region, and the particular particle region on the photoreceptor 1T is transferred onto the intermediate transfer belt 20. The particular particles remaining on the photoreceptor 1T are removed by the photoreceptor cleaning device 6T and recovered. The photoreceptor cleaning device 6T is, for example, a cleaning blade or a cleaning brush, and is preferably a cleaning brush.

An operation similar to that performed in the unit 10T is also performed in the units 10Y, 10M, 100, and 10K by using developers that contain color toners. The intermediate transfer belt 20 onto which the particular particle region is transferred in the unit 10T sequentially passes the units 10Y, 10M, 100, and 10K, and toner images of respective colors are transferred onto the intermediate transfer belt 20 in a superimposing manner.

The intermediate transfer belt 20 onto which a particular particle region and four toner images are superimposed and transferred as the intermediate transfer belt 20 passes the units 10T, 10Y, 10M, 100, and 10K reaches a second transfer section constituted by the intermediate transfer belt 20, the counter roll 24 in contact with the inner surface of the intermediate transfer belt 20, and a second transfer roll (one example of the second transfer section) 26 disposed on the image carrying surface side of the intermediate transfer belt 20. Meanwhile, a recording medium P is supplied to a gap where the second transfer roll 26 and the intermediate transfer belt 20 contact each other via a supplying mechanism, and a second transfer bias is applied to the counter roll 24. During this process, an electrostatic force working from the intermediate transfer belt 20 toward the recording medium P acts on the particular particle region and the toner images, and the particular particle region and the toner images on the intermediate transfer belt 20 are transferred onto the recording medium P.

The recording medium P onto which the particular particle region and the toner images have been transferred is conveyed to a heating device (one example of the particle heating section) 28, which is one example of the bonding unit. The color toner images are thermally fixed to the recording medium P by being heated by the heating device 28, and, at the same time, the particular particle region is heated, thereby promoting plasticization of the particular particles.

From the viewpoint of suppressing detachment of the particular particles from the recording medium P, the viewpoint of improving the fixability of the color toners to the recording medium P, and the viewpoint of promoting plasticization of the particular particles, the heating device 28 may be a device that applies both heat and pressure (this device is also referred to as a "heating and pressurizing device").

When the heating device 28 is a heating and pressurizing device, for example, the heating device 28 may be equipped with a heating source such as a halogen heater, and may include a pair of rolls that contact and heat the particular particle region and the toner images on the recording medium P. The color toner images are thermally fixed to the recording medium P as the recording medium having the particular particle region and toner images thereon passes between the pair of rolls, and, at the same time, the particular particle region is heated, thereby promoting plasticization of the particular particles.

As described above, as the recording medium P passes the printing section 300, the recording medium P turns into a particle-provided recording medium P4 on which a color image is formed and particular particles are provided in a particular region that constitutes a portion to be folded.

The particle-provided recording medium P4 is then conveyed toward the pressure-bonding section 400.

In the system for producing a printed material according to this exemplary embodiment, the printing section 300 and the pressure-bonding section 400 may be close to each other or distant from each other.

When the printing section 300 and the pressure-bonding section 400 are distant from each other, the printing section 300 and the pressure-bonding section 400 are, for example, linked via a conveying section (for example, a belt conveyor) that conveys the particle-provided recording medium P4.

The pressure-bonding section 400 is equipped with a multilayer body forming device 420 and a pressurizing device 230, and pressurizes a multilayer body P5 obtained by stacking and folding particle-provided recording media P4.

The multilayer body forming device 420 stack particle-provided recording media P4 passing therethrough and folds the particle-provided recording media P4 along the folding lines so as to form a multilayer body P5. In the multilayer body P5, the particular regions of the respective recording media are on top of each other.

The multilayer body P5 that has exited the multilayer body forming device 420 is conveyed toward the pressurizing device 230.

The pressurizing device 230 is equipped with, for example, a pair of rolls (in other words, pressurizing rolls 231 and 232). The pressurizing roll 231 and the pressurizing roll 232 are, for example, spaced from each other, and as the multilayer body P5 passes between the pair of rolls, a pressure is applied to the multilayer body P5 in the thickness direction.

As the multilayer body P5 passing the pressurizing device 230 is pressurized, the particular regions of the recording media become bonded to each other with the fluidized particular particles, and a printed material P6 is obtained.

The finished printed material P6 is discharged from the pressurizing device 230.

In the system for producing a printed material according to this exemplary embodiment, the multilayer body forming device 420 and the pressurizing device 230 may be close to each other or distant from each other. When the multilayer body forming device 420 and the pressurizing device 230 are distant from each other, the multilayer body forming device 420 and the pressurizing device 230 are, for example, linked via a conveying section (for example, a belt conveyor) that conveys the multilayer body P5.

The system for producing a printed material according to this exemplary embodiment may be equipped with a cutting section that cuts the recording medium into a predetermined size. Examples of the cutting section include a cutting section that is disposed between the printing section 300 and the pressure-bonding section 400 and cuts off a part of the particle-provided recording medium P4; a cutting section that is disposed between the multilayer body forming device 420 and the pressurizing device 230 and cuts off a part of the multilayer body P5; and a cutting section that is disposed downstream of the pressure-bonding section 400 and cuts off a part of the printed material P6.

The cutting section may cut off a part of the region where the particular particles are placed or may cut off only the region where the particular particles are not placed.

The system for producing a printed material according to this exemplary embodiment is not limited to a single-sheet type. The system for producing a printed material according to this exemplary embodiment may be of a type that performs a placing step and a pressure-bonding step on a long recording medium to form a long printed material, and then cuts the long printed material into a predetermined size.

Particular Particles

The particular particles of the exemplary embodiment contain at least base particles and, if needed, an external additive.

In other words, the base particles contained in the particular particles contain: a styrene resin containing styrene and a vinyl monomer other than styrene as polymerization components; and a (meth)acrylic acid ester resin that contains at least two (meth)acrylic acid esters as polymerization components, in which the mass ratio of the (meth)acrylic acid esters relative to the total of polymerization components is 90 mass or more. In addition, the base particles have at least two glass transition temperatures, and the difference between the highest glass transition temperature and the lowest glass transition temperature is 30° C. or more.

Base Particles

Binder Resin

The base particles contain, as binder resins, a styrene resin containing styrene and a vinyl monomer other than styrene as polymerization components, and a (meth)acrylic acid ester resin that contains at least two (meth)acrylic acid esters as polymerization components, in which the mass ratio of the (meth)acrylic acid esters relative to the total of polymerization components is 90 mass or more.

In the description below, a "styrene resin that contains styrene and a vinyl monomer other than styrene as polymerization components" may be simply referred to as a "particular styrene resin", and a "(meth)acrylic acid ester resin that contains at least two (meth)acrylic acid esters as polymerization components, in which the mass ratio of the (meth)acrylic acid esters relative to the total of polymerization components is 90 mass % or more" may be simply referred to as a "particular (meth)acrylic acid ester resin".

From the viewpoint of maintaining bondability achieved by pressure bonding, the base particles may contain a larger amount of the particular styrene resin than the particular (meth)acrylic acid ester resin. The amount of the particular styrene resin relative to the total amount of the particular styrene resin and the particular (meth)acrylic acid ester resin is preferably 55 mass % or more and 80 mass % or less, more preferably 60 mass % or more and 75 mass % or less, and yet more preferably 65 mass % or more and 70 mass % or less.

Particular Styrene Resin

The base particles that constitute the particular particles contain a particular styrene resin that contains styrene and a vinyl monomer other than styrene as polymerization components.

From the viewpoint of suppressing fluidization of the particular particles in an unpressured state, the mass ratio of styrene relative to the total of the polymerization components of the particular styrene resin is preferably 60 mass % or more, more preferably 70 mass % or more, and yet more preferably 75 mass % or more.

From the viewpoint of forming particular particles that easily undergo pressure-induced phase transition, the mass ratio of styrene relative to the total of the polymerization components of the particular styrene resin is preferably 95 mass % or less, more preferably 90 mass % or less, and yet more preferably 85 mass % or less.

In other words, the mass ratio of styrene relative to the total of the polymerization components of the particular styrene resin is preferably 60 mass % or more and 95 mass % or less.

Examples of the vinyl monomers other than styrene contained as polymerization components of the particular styrene resin (hereinafter, such monomers may also be referred to as "other vinyl monomers") include styrene monomers and acryl monomers.

Examples of the styrene monomers used as other vinyl monomers include vinyl naphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, p-fluorostyrene, and 2,5-difluorostyrene; and nitro-substituted styrenes such as m-nitrostyrene, o-nitrostyrene, and p-nitrostyrene.

These styrene monomers may be used alone or in combination.

The acryl monomer used as other vinyl monomers may be at least one acryl monomer selected from the group consisting of (meth)acrylic acid and (meth)acrylic acid esters.

Examples of the (meth)acrylic acid esters include (meth)acrylic acid alkyl esters, (meth)acrylic acid carboxy-substituted alkyl esters, (meth)acrylic acid hydroxy-substituted alkyl esters, (meth)acrylic acid alkoxy-substituted alkyl esters, and di(meth)acrylic acid esters.

These acryl monomers may be used alone or in combination.

Examples of the (meth)acrylic acid alkyl esters include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

An example of the (meth)acrylic acid carboxy-substituted alkyl ester is 2-carboxylethyl (meth)acrylate.

Examples of the (meth)acrylic acid hydroxy-substituted alkyl esters include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the (meth)acrylic acid alkoxy-substituted alkyl ester is 2-methoxyethyl (meth)acrylate.

Examples of the di(meth)acrylic acid esters include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylic acid esters also include 2-(diethylamino)ethyl (meth)acrylate, benzyl (meth)acrylate, and methoxypolyethylene glycol (meth) acrylate.

Examples of other vinyl monomers contained as the polymerization components of the particular styrene resin include, in addition to the styrene monomers and acryl monomers, (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene.

From the viewpoint of forming particular particles that easily undergo pressure-induced phase transition, the other vinyl monomers contained as polymerization components of the particular styrene resin preferably contain a (meth) acrylic acid ester, more preferably a (meth)acrylic acid alkyl ester, yet more preferably a (meth)acrylic acid alkyl ester in which the alkyl group contains 2 to 10 carbon atoms, and still more preferably a (meth)acrylic acid alkyl ester in which the alkyl group contains 4 to 8 carbon atoms.

From the viewpoint of forming particular particles that easily undergo pressure-induced phase transition, the other vinyl monomers contained as the polymerization components of the particular styrene resin particularly preferably contain at least one of n-butyl acrylate and 2-ethylhexyl acrylate.

From the viewpoint of forming particular particles that easily undergo pressure-induced phase transition, the particular styrene resin and the particular (meth)acrylic acid ester resin described below may contain the same (meth) acrylic acid ester as a polymerization component.

From the viewpoint of suppressing fluidization of the particular particles in an unpressured state, the mass ratio of the (meth)acrylic acid ester relative to the total of the polymerization components of the particular styrene resin is preferably 40 mass % or less, more preferably 30 mass % or less, and yet more preferably 25 mass % or less. From the viewpoint of forming particular particles that easily undergo pressure-induced phase transition, the mass ratio is preferably 5 mass % or more, more preferably 10 mass % or more, and yet more preferably 15 mass % or more. The (meth)acrylic acid ester here is preferably a (meth)acrylic acid alkyl ester, yet more preferably a (meth)acrylic acid alkyl ester in which the alkyl group contains 2 to 10 carbon atoms, and still more preferably a (meth)acrylic acid alkyl ester in which the alkyl group contains 4 to 8 carbon atoms.

The particular styrene resin particularly preferably contains, as a polymerization component, at least one of n-butyl acrylate and 2-ethylhexyl acrylate, and the total amount of n-butyl acrylate and 2-ethylhexyl acrylate relative to the total of polymerization components of the styrene resin is preferably 40 mass % or less, more preferably 30 mass % or less, and yet more preferably 25 mass % or less from the viewpoint of suppressing fluidization of the particles in an unpressured state. From the viewpoint of forming particular particles that easily undergo pressure-induced phase transition, the total amount is preferably 5 mass % or more, more preferably 10 mass % or more, and yet more preferably 15 mass % or more.

From the viewpoint of suppressing fluidization of the particular particles in an unpressured state, the weight-average molecular weight of the particular styrene resin is preferably 3000 or more, more preferably 4000 or more, and yet more preferably 5000 or more. From the viewpoint of forming particular particles that easily undergo pressure-induced phase transition, the weight-average molecular weight is preferably 60000 or less, more preferably 55000 or less, and yet more preferably 50000 or less.

In the present disclosure, the weight-average molecular weight of a resin is measured by gel permeation chromatography (GPC). The molecular weight measurement by GPC is conducted by using HLC-8120GPC produced by TOSOH CORPORATION as a GPC instrument with columns, TSKgel Super HM-M (15 cm) produced by TOSOH CORPORATION, and tetrahydrofuran as a solvent. The weight-average molecular weight of a resin is calculated by using a molecular weight calibration curve prepared by using monodisperse polystyrene standard samples.

From the viewpoint of suppressing fluidization of the particular particles in an unpressured state, the glass transition temperature of the particular styrene resin is preferably 30° C. or more, more preferably 40° C. or more, and yet more preferably 50° C. or more. From the viewpoint of forming particular particles that easily undergo pressure-induced phase transition, the glass transition temperature is preferably 110° C. or less, more preferably 100° C. or less, and yet more preferably 90° C. or less.

In the present disclosure, the glass transition temperature of a resin is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The glass transition temperature of a resin is controlled by the types of polymerization components and the polymerization ratios. The glass transition temperature has a tendency to decrease as the density of flexible units, such as a methylene group, an ethylene group, and an oxyethylene group, contained in the main chain increases, and has a tendency to increase as the density of rigid units, such as aromatic rings and cyclohexane rings, contained in the main chain increases. Moreover, the glass transition temperature has a tendency to decrease as the density of aliphatic groups in side chains increases.

From the viewpoint of suppressing fluidization of the particular particles in an unpressured state, the mass ratio of the particular styrene resin relative to the entire base particles is preferably 55 mass % or more, more preferably 60 mass % or more, and yet more preferably 65 mass % or more. From the viewpoint of forming particular particles that easily undergo pressure-induced phase transition, the mass ratio is preferably 80 mass % or less, more preferably 75 mass % or less, and yet more preferably 70 mass % or less.

Particular (Meth)Acrylic Acid Ester Resin

The base particles constituting the particular particles contain at least two (meth)acrylic acid esters as polymerization components, and the mass ratio of the (meth)acrylic acid esters relative to the total of polymerization components is 90 mass % or more.

The mass ratio of the (meth)acrylic acid esters relative to the total of the polymerization components of the (meth)acrylic acid ester resin is 90 mass % or more, preferably 95 mass % or more, more preferably 98 mass % or more, and yet more preferably 100 mass %.

Examples of the (meth)acrylic acid esters include (meth)acrylic acid alkyl esters, (meth)acrylic acid carboxy-substituted alkyl esters, (meth)acrylic acid hydroxy-substituted alkyl esters, (meth)acrylic acid alkoxy-substituted alkyl esters, and di(meth)acrylic acid esters.

Examples of the (meth)acrylic acid alkyl esters include methyl (meth)acrylate, ethyl (meth)acrylate, propyl (meth)acrylate, isopropyl (meth)acrylate, n-butyl (meth)acrylate, isobutyl (meth)acrylate, n-hexyl (meth) acrylate, 2-ethylhexyl (meth) acrylate, lauryl (meth)acrylate, stearyl (meth)acrylate, cyclohexyl (meth) acrylate, dicyclopentanyl (meth)acrylate, and isobornyl (meth) acrylate.

An example of the (meth)acrylic acid carboxy-substituted alkyl ester is 2-carboxylethyl (meth)acrylate.

Examples of the (meth)acrylic acid hydroxy-substituted alkyl esters include 2-hydroxyethyl (meth)acrylate, 2-hydroxypropyl (meth) acrylate, 3-hydroxypropyl (meth) acrylate, 2-hydroxybutyl (meth) acrylate, 3-hydroxybutyl (meth)acrylate, and 4-hydroxybutyl (meth) acrylate.

An example of the (meth)acrylic acid alkoxy-substituted alkyl ester is 2-methoxyethyl (meth)acrylate.

Examples of the di(meth)acrylic acid esters include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylic acid esters also include 2-(diethylamino)ethyl (meth)acrylate, benzyl (meth) acrylate, and methoxypolyethylene glycol (meth) acrylate.

These (meth)acrylic acid esters may be used alone or in combination.

From the viewpoint of forming particular particles that easily undergo pressure-induced phase transition and have excellent bondability achieved by pressure bonding, the (meth)acrylic acid esters are preferably (meth)acrylic acid alkyl esters, yet more preferably (meth)acrylic acid alkyl esters in which the alkyl group contains 2 to 10 carbon atoms, still more preferably (meth)acrylic acid alkyl esters in which the alkyl group contains 4 to 8 carbon atoms, and particularly preferably n-butyl acrylate and 2-ethylhexyl acrylate.

As described above, from the viewpoint of forming particular particles that easily undergo pressure-induced phase transition, the particular (meth)acrylic acid ester resin and the particular styrene resin may contain the same (meth) acrylic acid ester as a polymerization component.

From the viewpoint of forming particular particles that easily undergo pressure-induced phase transition and have excellent bondability achieved by pressure bonding, the mass ratio of the (meth)acrylic acid alkyl esters relative to the total of the polymerization components of the particular (meth)acrylic acid ester resin is preferably 90 mass % or more, more preferably 95 mass % or more, yet more preferably 98 mass or more, and still more preferably 100 mass %. The (meth)acrylic acid alkyl esters here preferably each have an alkyl group containing 2 to 10 carbon atoms and more preferably each have an alkyl group containing 4 to 8 carbon atoms.

From the viewpoint of forming particular particles that easily undergo pressure-induced phase transition and have excellent bondability achieved by pressure bonding, the mass ratio between two (meth)acrylic acid esters having the largest and second-largest mass ratios among the at least two (meth)acrylic acid esters contained as polymerization components in the particular (meth)acrylic acid ester resin is preferably 80:20 to 20:80, more preferably 70:30 to 30:70, and yet more preferably 60:40 to 40:60.

The two (meth)acrylic acid esters having the largest and second-largest mass ratios among the at least two (meth) acrylic acid esters contained as polymerization components in the particular (meth)acrylic acid ester resin are preferably (meth)acrylic acid alkyl esters. The (meth)acrylic acid alkyl esters here preferably each have an alkyl group having 2 to 10 carbon atoms and more preferably each have an alkyl group containing 4 to 8 carbon atoms.

When the two (meth)acrylic acid esters having the largest and second-largest mass ratios among the at least two (meth)acrylic acid esters contained as polymerization components in the particular (meth)acrylic acid ester resin are (meth)acrylic acid alkyl esters, from the viewpoint of forming particular particles that easily undergo pressure-induced phase transition and have excellent bondability achieved by pressure bonding, the difference in the number of carbon atoms in the alkyl group between the two (meth)acrylic acid alkyl esters is preferably 1 to 4, more preferably 2 to 4, and yet more preferably 3 or 4.

From the viewpoint of forming particular particles that easily undergo pressure-induced phase transition and have excellent bondability achieved by pressure bonding, the particular (meth)acrylic acid ester resin preferably contains, as polymerization components, n-butyl acrylate and 2-ethylhexyl acrylate. In particular, the two (meth)acrylic acid esters having the largest and second-largest mass ratios among the at least two (meth)acrylic acid esters contained as polymerization components in the (meth)acrylic acid ester resin are preferably n-butyl acrylate and 2-ethylhexyl acrylate. The total amount of n-butyl acrylate and 2-ethylhexyl acrylate relative to the total of the polymerization components of the (meth)acrylic acid ester resin is preferably 90 mass % or more, more preferably 95 mass % or more, yet more preferably 98 mass % or more, and still more preferably 100 mass %.

The particular (meth)acrylic acid ester resin may further contain, as polymerization components, vinyl monomers other than (meth)acrylic acid esters.

Examples of the vinyl monomers other than the (meth) acrylic acid esters include (meth)acrylic acid; styrene; styrene monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene. These vinyl monomers may be used alone or in combination.

When the particular (meth)acrylic acid ester resin contains, as a polymerization component, a vinyl monomer other than (meth)acrylic acid esters, the vinyl monomer other than the (meth)acrylic acid esters is preferably at least one of acrylic acid and methacrylic acid and is more preferably acrylic acid.

From the viewpoint of suppressing fluidization of particles in an unpressured state, the weight-average molecular weight of the particular (meth)acrylic acid ester resin is preferably 50,000 or more, more preferably 100,000 or more, and yet more preferably 120,000 or more. From the viewpoint of forming particles that easily undergo pressure-induced phase transition, the weight-average molecular weight is preferably 250,000 or less, more preferably 220,000 or less, and yet more preferably 200,000 or less.

From the viewpoint of forming particles that easily undergo pressure-induced phase transition, the glass transition temperature of the particular (meth)acrylic acid ester resin is preferably 10° C. or less, more preferably 0° C. or less, and yet more preferably −10° C. or less. From the viewpoint of suppressing fluidization of the particles in an unpressured state, the glass transition temperature is preferably −90° C. or more, more preferably −80° C. or more, and yet more preferably −70° C. or more.

In this exemplary embodiment, from the viewpoint of forming particles that easily undergo pressure-induced phase transition, the mass ratio of the particular (meth)acrylic acid ester resin relative to the entire base particles is preferably 20 mass % or more, more preferably 25 mass % or more, and yet more preferably 30 mass % or more. From the viewpoint of suppressing fluidization of particles in an unpressured state, the mass ratio is preferably 45 mass % or less, more preferably 40 mass % or less, and yet more preferably 35 mass % or less.

In this exemplary embodiment, the total amount of the particular styrene resin and the particular (meth)acrylic acid ester resin contained in the base particles relative to the entire base particles is preferably 70 mass % or more, more preferably 80 mass % or more, yet more preferably 90 mass % or more, still preferably 95 mass % or more, and most preferably 100 mass %.

If needed, the base particles may contain polystyrene, non-vinyl resins such as epoxy resins, polyester resins, polyurethane resins, polyamide resins, cellulose resins, polyether resins, and modified rosin, or the like.

These resins may be used alone or in combination.

Other Components

The base particles may contain other components as necessary.

Examples of other components include coloring agents (for example, pigments and dyes), releasing agents (for example, hydrocarbon wax; natural wax such as carnauba wax, rice wax, and candelilla wax; synthetic or mineral or petroleum wax such as montan wax; and ester wax such as fatty acid esters and montanic acid esters), and charge controlling agents.

The particular particles may contain a coloring agent as long as the visibility of the image is not impaired.

From the viewpoint of enhancing the transparency of the particular particles, the amount of the coloring agent in the base particles may be as small as possible. Specifically, the amount of the coloring agent relative to the entire base particles is preferably 1.0 mass % or less, more preferably 0.1 mass % or less, yet more preferably 0.01 mass % or less, and still more preferably zero.

The particular particles may be transparent.

In this exemplary embodiment, "transparent" means that the average transmittance of the region in which the particular particles are provided is 10% or more for light in the visible range (400 nm or more and 700 nm or less). The average transmittance is preferably 50% or more, more preferably 80% or more, and yet more preferably 90% or more.

The average transmittance is measured with a spectrophotometer V700 (produced by JASCO Corporation).

Structure of Base Particles

The inner structure of the base particles may be a sea-island structure.

The sea-island structure may be a sea-island structure that has a sea phase containing one of the two or more binder resins, and island phases being dispersed in the sea phase and containing another one of the two or more binder resins. From the viewpoint of inducing the pressure-induced phase transition, more specifically, a sea-island structure that includes a sea phase containing a particular styrene resin and island phases dispersed in the sea phase and containing a particular (meth)acrylic acid ester resin is preferable. The details of the particular styrene resin contained in the sea phase and the (meth)acrylic acid ester resin contained in the island phases are as described above. Alternatively, island phases not containing a (meth)acrylic acid ester resin may be dispersed in the sea phase.

When the base particles have a sea-island structure, the average size of the island phases may be 200 nm or more and 500 nm or less. When the average size of the island phases is 500 nm or less, the base particles easily undergo pressure-induced phase transition. When the average size of the island phases is 200 nm or more, excellent mechanical strength desired for the base particles (for example, the strength that withstands deformation during stirring in a developing device) is exhibited. From these viewpoints, the average size of the island phases is more preferably 220 nm or more and 450 nm or less and yet more preferably 250 nm or more and 400 nm or less.

Examples of the method for controlling the average size of the island phases of the sea-island structure to be within the aforementioned range include increasing or decreasing the amount of the particular (meth)acrylic acid ester resin relative to the amount of the particular styrene resin and increasing or decreasing the length of time of maintaining a high temperature in the step of fusing and coalescing aggregated particles in the method for producing base particles described below.

The sea-island structure is confirmed and the average size of the island phases is measured as follows.

The particular particles are embedded in an epoxy resin, a section is prepared by using a diamond knife or the like, and the prepared section is stained with osmium tetroxide or ruthenium tetroxide in a desiccator. The stained section is observed with a scanning electron microscope (SEM). The sea phase and the island phases of the sea-island structure are distinguished by the shade created by the degree of staining with osmium tetroxide or ruthenium tetroxide, and the presence or absence of the sea-island structure is identified by the shade. From an SEM image, one hundred island phases are selected at random, a long axis of each island phase is measured, and the average of one hundred long axes is used as the average size.

The base particles may be a single-layer-structure base particles, or core-shell-structure base particles each constituted by a core and a shell layer coating the core. From the viewpoint of suppressing fluidization of the particular particles in an unpressured state, the base particles may have a core-shell structure.

From the viewpoint of inducing the phase transition under pressure, when the base particles have a core-shell structure, the core may contain the particular styrene resin and the particular (meth)acrylic acid ester resin. From the viewpoint of suppressing fluidization of the particular particles in an unpressured state, the shell layer may contain the particular styrene resin.

When the base particles have a core-shell structure, the core may have a sea phase containing the particular styrene resin and island phases containing the particular (meth)acrylic acid ester resin dispersed in the sea phase. The average size of the island phases may be within the aforementioned range. In addition to the core having the above-described structure, the shell layer may contain the particular styrene resin. In such a case, the sea phase of the core and the shell layer form a continuous structure, and the base particles easily undergo pressure-induced phase transition.

Examples of the resin contained in the shell layer also include polystyrene, and non-vinyl resins such as epoxy resins, polyester resins, polyurethane resins, polyamide resins, cellulose resins polyether resins, and modified rosin.

These resins may be used alone or in combination.

From the viewpoint of suppressing deformation of the base particles, the average thickness of the shell layer is preferably 120 nm or more, more preferably 130 nm or more, and yet more preferably 140 nm or more. From the viewpoint of inducing the phase transition of the base particles under pressure, the average thickness is preferably 550 nm or less, more preferably 500 nm or less, and yet more preferably 400 nm or less.

The average thickness of the shell layer is measured by the following method.

The particles are embedded in an epoxy resin, a section is prepared by using a diamond knife or the like, and the prepared section is stained with osmium tetroxide or ruthenium tetroxide in a desiccator. The stained section is observed with a scanning electron microscope (SEM). From an SEM image, ten base particle sections are selected at random, the thickness of the shell layer is measured at twenty positions per base particle, and the average thickness is calculated. The average value of ten base particles is used as the average thickness.

From the viewpoint of ease of handling the base particles, the volume-average particle diameter (D50v) of the base particles is preferably 4 μm or more, more preferably 5 μm or more, and yet more preferably 6 μm or more. The volume-average particle diameter of the base particles is preferably 15 μm or less, more preferably 12 μm or less, and yet more preferably 10 μm or less.

The volume-average particle diameter (D50v) of the base particles is determined by using a COULTER MULTISIZER II (produced by Beckman Coulter Inc.) with apertures having an aperture diameter of 100 μm. Into 2 mL of a 5 mass % aqueous sodium alkyl benzenesulfonate solution, 0.5 mg or more and 50 mg or less of base particles are added and dispersed, and then the resulting dispersion is mixed with 100 mL or more and 150 mL or less of an electrolyte (ISOTON-II produced by Beckman Coulter Inc.). The resulting mixture is dispersed for 1 minute in an ultrasonic disperser, and the obtained dispersion is used as a sample. The particle diameters of 50000 particles having a particle diameter of 2 μm or more and 60 μm or less in the sample are measured. The particle diameter at 50% accumulation in a volume-based particle size distribution calculated from the small diameter side is used as the volume-average particle diameter (D50v).

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobizing involves, for example, immersing inorganic particles in a hydrophobizing agent. The hydrophobizing agent may be any, and examples thereof include silane coupling agents, silicone oils, titanate coupling agents, and aluminum coupling agents. These may be used alone or in combination. The amount of the hydrophobizing agent is, for example, 1 part by mass or more and 10 parts by mass or less relative to 100 parts by mass of the inorganic particles.

Other examples of the external additive include resin particles (resin particles of polystyrene, polymethyl methacrylate, melamine resin, etc.), and cleaning activating agents (for example, particles of metal salts of higher aliphatic acids such as zinc stearate and fluorine high-molecular-weight materials).

The externally added amount of the external additive is preferably 0.01 mass % or more and 5 mass % or less and is more preferably 0.01 mass % or more and 2.0 mass % or less relative to the base particles.

Properties of Particular Particles

The particular particles have at least two glass transition temperatures, one of which is presumably derived from one of the two or more binder resins, and another one of which is presumably derived from another one of the two or more binder resins. As described above, when a binder resin contains a particular styrene resin and a particular (meth) acrylic acid ester resin, one of the glass transition temperatures is presumed to be that of the styrene resin, and another glass transition temperature is presumed to be that of the (meth)acrylic acid ester resin.

The particular particles may have three or more glass transition temperatures; however, the number of glass transition temperatures is preferably two. Examples of the case in which there are two glass transition temperatures include the case in which a particular styrene resin and a particular (meth)acrylic acid ester resin are the only resins contained in the particular particles, and the case in which the amount of resins other than the particular styrene resin and the particular (meth)acrylic acid ester resin is small (for example, the amount of other resins is 5 mass or less relative to the entire particular particles).

The particular particles have at least two glass transition temperatures, and the difference between the lowest glass transition temperature and the highest glass transition temperature is 30° C. or more. From the viewpoint of inducing the particles to undergo phase transition under pressure, the difference between the lowest glass transition temperature and the highest glass transition temperature is preferably 40° C. or more, yet more preferably 50° C. or more, and still more preferably 60° C. or more. The upper limit of the difference between the highest glass transition temperature and the lowest glass transition temperature is, for example, 140° C. or less, and may be 130° C. or less or 120° C. or less.

From the viewpoint of inducing particles to undergo pressure-induced phase transition, the glass transition temperature of the particular particles is preferably 10° C. or less, more preferably 0° C. or less, and yet more preferably −10° C. or less. From the viewpoint of suppressing fluidization of the particles in an unpressured state, the glass transition temperature is preferably −90° C. or more, more preferably −80° C. or more, and yet more preferably −70° C. or more.

From the viewpoint of suppressing fluidization of particles in an unpressured state, the highest glass transition temperature of the particular particles is preferably 30° C. or more, more preferably 40° C. or more, and yet more preferably 50° C. or more. From the viewpoint of inducing particles to undergo phase transition under pressure, the highest glass transition temperature is preferably 70° C. or less, more preferably 65° C. or less, and yet more preferably 60° C. or less.

In the present disclosure, the glass transition temperatures of the particular particles are determined from a differential scanning calorimetry curve (DSC curve) obtained by performing differential scanning calorimetry (DSC) on a plate-shaped sample prepared by compressing the resin particles. More specifically, the glass transition temperature is determined from the "extrapolated glass transition onset temperature" described in the method for determining the glass transition temperature in JIS K 7121:1987 "Testing Methods for Transition Temperatures of Plastics".

The particular particles are particles that undergo phase transition under pressure, and satisfy formula 1 below:

$$10° C. \leq T1-T2 \quad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa. The method for determining T1 and T2 is described below.

From the viewpoint of inducing phase transition of the particles under pressure, the temperature difference (T1−T2) is preferably 10° C. or more, more preferably 15° C. or more, and yet more preferably 20° C. or more. From the viewpoint of suppressing fluidization of the particular particles in an unpressured state, the temperature difference (T1−T2) is preferably 120° C. or less, more preferably 100° C. or less, and yet more preferably 80° C. or less.

The value of T1 is preferably 140° C. or less, more preferably 130° C. or less, yet more preferably 120° C. or less, and still more preferably 115° C. or less. The lower limit of the temperature T1 is preferably 80° C. or more and more preferably 85° C. or more.

The value of T2 is preferably 40° C. or more, more preferably 50° C. or more, and yet more preferably 60° C. or more. The upper limit of the temperature T2 may be 85° C. or less.

One indicator of how easily the particular particles undergo pressure-induced phase transition is the temperature difference (T1−T3) between the temperature T1 at which the viscosity is 10000 Pa·s at a pressure of 1 MPa and the temperature T3 at which the viscosity is 10000 Pa·s at a pressure of 4 MPa. The temperature difference (T1−T3) may be 5° C. or more. The temperature difference ($T_1-T_2$) is typically 25° C. or less.

From the viewpoint of inducing the phase transition under pressure, the temperature difference (T1−T2) of the particular particles is preferably 5° C. or more and more preferably 10° C. or more.

The upper limit of the temperature difference (T1−T3) is typically 25° C. or less.

From the viewpoint of adjusting the temperature difference (T1−T3) to 5° C. or more, the temperature T3 at which the particular particles show a viscosity of 10000 Pa·s at a pressure of 4 MPa is preferably 90° C. or less, more preferably 85° C. or less, and yet more preferably 80° C. or less. The lower limit of the temperature T3 may be 60° C. or more.

The method for determining the temperature T1, the temperature T2, and the temperature T3 is as follows.

Particular particles are compressed into a pellet-shaped sample. The pellet-shaped sample is placed in a Flowtester (CFT-500 produced by Shimadzu Corporation), the applied pressure is fixed at 1 MPa, and the viscosity at 1 MPa relative to the temperature is measured. From the obtained viscosity graph, the temperature T1 at which the viscosity is $10^4$ Pa·s at an applied pressure of 1 MPa is determined. The temperature T2 is determined as with the method for determining the temperature T1 except that the applied pressure is changed from 1 MPa to 10 MPa. The temperature T3 is determined as with the method for determining the temperature T1 except that the applied pressure is changed from 1 MPa to 4 MPa. The temperature difference (T1−T2) is calculated from the temperature T1 and the temperature T2. The temperature difference (T1−T3) is calculated from the temperature T1 and the temperature T3.

Method for Producing Particular Particles

The particular particles are obtained by first producing base particles and then externally adding an external additive to the base particles.

The base particles may be produced by a dry method (for example, a kneading and pulverizing method) or a wet method (for example, an aggregation and coalescence method, a suspension polymerization method, or a dissolution suspension method). There is no limitation on these methods, and any known method may be employed. Among these methods, the aggregation and coalescence method may be employed to produce base particles.

In the description below, a method for producing base particles by an aggregation and coalescence method is described as one example.

When the base particles are to be produced by the aggregation and coalescence method, the base particles are produced through, for example, the following steps:

a step of preparing a styrene resin particle dispersion in which styrene resin particles containing a particular styrene resin are dispersed (styrene resin particle dispersion preparation step);

a step of polymerizing a particular (meth)acrylic acid ester resin in the styrene resin particle dispersion so as to form composite resin particles containing the particular styrene resin and the particular (meth)acrylic acid ester resin (composite resin particle forming step);

a step aggregating the composite resin particles in the composite resin particle dispersion in which the composite resin particles are dispersed so as to form aggregated particles (aggregated particle forming step); and a step of heating the aggregated particle dispersion in which the aggregated particles are dispersed so as to fuse and coalesce the aggregated particles and thereby form base particles (fusing and coalescing step).

These steps will now be described in detail.

In the description below, a method for obtaining base particles free of any releasing agent is described. A releasing agent and other additives may be used as needed.

When a coloring agent and/or a releasing agent is to be contained in the base particles, in the aggregated particle forming step, a coloring agent particle dispersion and/or a releasing agent particle dispersion is mixed with the composite resin particle dispersion so as to aggregate the composite resin particles with the coloring agent and/or releasing agent to form aggregated particles.

The coloring agent particle dispersion and the releasing agent particle dispersion can each be prepared by, for example, mixing a coloring agent or a releasing agent with a dispersion medium and then performing a dispersing treatment in a known disperser machine.

Styrene Resin Particle Dispersion Preparation Step

In the styrene resin particle dispersion preparation step, a styrene resin particle dispersion in which styrene resin particles containing a particular styrene resin are dispersed is prepared.

The styrene resin particle dispersion is, for example, prepared by dispersing styrene resin particles in a dispersion medium by using a surfactant.

Examples of the dispersion medium include aqueous media such as water and alcohols. These may be used alone or in combination.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. A nonionic surfactant may be used in combination with an anionic surfactant or a cationic surfactant. Among these, an anionic surfactant may be used. The surfactants may be used alone or in combination.

Examples of the method for dispersing the styrene resin particles in a dispersion medium include methods that involve mixing a particular styrene resin and a dispersion medium and then dispersing the resin by stirring in a rotational shear-type homogenizer, or a mill that uses media such as a ball mill, a sand mill, or a dyno mill.

Another example of the method for dispersing styrene resin particles in a dispersion medium is an emulsion polymerization method. Specifically, after polymerization components of a particular styrene resin, and a chain transfer agent or a polymerization initiator are mixed, an aqueous medium containing a surfactant is further added to the resulting mixture, the resulting mixture is stirred to prepare an emulsion, and the styrene resin is polymerized in the emulsion. Here, the chain transfer agent may be dodecanethiol.

The volume-average particle diameter of the styrene resin particles dispersed in the styrene resin particle dispersion is preferably 100 nm or more and 250 nm or less, more preferably 120 nm or more and 220 nm or less, and yet more preferably 150 nm or more and 200 nm or less.

The volume-average particle diameter (D50v) of the resin particles contained in the resin particle dispersion is determined by measuring the particle diameter with a laser diffraction scattering particle size distribution meter (for example, LA-700 produced by Horiba Ltd.) and determining the particle diameter at 50% accumulation in a volume-average particle size distribution calculated from the small diameter side.

The amount of the styrene resin particles in the styrene resin particle dispersion relative to the total mass of the styrene resin particle dispersion is preferably 30 mass % or more and 60 mass % or less and is more preferably 40 mass % or more and 50 mass % or less.

Composite Resin Particle Forming Step

In the composite resin particle forming step, the particular (meth)acrylic acid ester resin is polymerized in the styrene resin particle dispersion so as to form composite resin particles containing the particular styrene resin and the particular (meth)acrylic acid ester resin.

In the composite resin particle forming step, the styrene resin particle dispersion and polymerization components of the particular (meth)acrylic acid ester resin are mixed, and the particular (meth)acrylic acid ester resin is polymerized in the styrene resin particle dispersion so as to form composite resin particles containing the particular styrene resin and the particular (meth)acrylic acid ester resin.

The composite resin particles may be resin particles containing a particular styrene resin and a particular (meth)acrylic acid ester resin that are in a microphase-separated state. The resin particles are produced by the following method, for example.

To a styrene resin particle dispersion, polymerization components (a group of monomers including at least two (meth)acrylic acid esters) of a particular (meth)acrylic acid ester resin are added, and, if needed, an aqueous medium is added thereto. Next, while slowly stirring the dispersion, the temperature of the dispersion is elevated to a temperature higher than or equal to the glass transition temperature of the particular styrene resin (for example, a temperature 10° C. to 30° C. higher than the glass transition temperature of the particular styrene resin). Next, while maintaining the temperature, an aqueous medium containing a polymerization initiator is slowly added dropwise, and then stirring is continued for a long time within the range of 1 to 15 hours. Here, the polymerization initiator may be ammonium persulfate.

The detailed mechanism is not clear; however, it is presumed that when the aforementioned method is employed, the monomers and the polymerization initiator penetrate into the styrene resin particles, and the particular (meth)acrylic acid esters become polymerized inside the styrene resin particles. It is presumed that because of this mechanism, composite resin particles in which the particular (meth)acrylic acid ester resin is contained inside the styrene resin particles and in which the particular styrene resin and the particular (meth)acrylic acid ester resin are in a microphase-separated state inside the particles are obtained.

The volume-average particle diameter of the composite resin particles dispersed in the composite resin particle dispersion is preferably 140 nm or more and 300 nm or less, more preferably 150 nm or more and 280 nm or less, and yet more preferably 160 nm or more and 250 nm or less.

The composite resin particle content in the composite resin particle dispersion is preferably 20 mass or more and 50 mass or less and is more preferably 30 mass %, or more and 40 mass or less relative to the entire mass of the composite resin particle dispersion.

Aggregated Particle Forming Step

In the aggregated particle forming step, the composite resin particles in the composite resin particle dispersion are aggregated to form aggregated particles.

In the aggregated particle forming step, the composite resin particles are aggregated to form aggregated particles having diameters close to the target diameter of the base particles.

Specifically, for example, in the aggregated particle forming step, an aggregating agent is added to the composite resin particle dispersion while the pH of the composite resin particle dispersion is adjusted to acidic (for example, a pH of 2 or more and 5 or less), and after a dispersion stabilizer is added as needed, the dispersion is heated to a temperature close to the glass transition temperature of the particular styrene resin (specifically, for example, a temperature 10° C. to 30° C. lower than the glass transition temperature of the particular styrene resin) so as to aggregate the composite resin particles and form aggregated particles.

In the aggregated particle forming step, while the composite resin particle dispersion is being stirred in a rotational shear-type homogenizer, an aggregating agent may be added thereto at room temperature (for example, 25° C.) and the pH of the composite resin particle dispersion may be adjusted to acidic (for example, a pH2 or more and 5 or less), and then heating may be performed after the dispersion stabilizer is added as needed.

Examples of the aggregating agent include a surfactant having an opposite polarity to the surfactant contained in the composite resin particle dispersion, an inorganic metal salt, and a divalent or higher valent metal complex. When a metal complex is used as the aggregating agent, the amount of the surfactant used is reduced, and the charge properties are improved.

An additive that forms a complex with a metal ion in the aggregating agent or that forms a similar bond therewith may be used in combination with the aggregating agent as needed. An example of such an additive is a chelating agent.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass relative to 100 parts by mass of the resin particles.

Fusing and Coalescing Step

In the fusing and coalescing step, the aggregated particle dispersion in which the aggregated particles are dispersed is heated so as to fuse and coalesce the aggregated particles and thereby form base particles.

In the fusing and coalescing step, the aggregated particle dispersion containing dispersed aggregated particles is heated to, for example, a temperature equal to or higher than the glass transition temperature of the particular styrene resin (for example, a temperature 10° C. to 30° C. higher than the glass transition temperature of the particular styrene resin) to fuse and coalesce the aggregated particles and form base particles.

The base particles obtained through the above-described steps usually have a sea-island structure that has a sea phase containing a particular styrene resin and island phases that are dispersed in the sea phase and contain a particular (meth)acrylic acid ester resin. It is presumed that although the particular styrene resin and the particular (meth)acrylic acid ester resin are in a microphase-separated state in the composite resin particles, the particular styrene resin is gathered in the fusing and coalescing step to form a sea phase, and the particular (meth)acrylic acid ester resin is gathered to form island phases.

The average size of the island phases of the sea-island structure is controlled by, for example, increasing or decreasing the amount of the styrene resin particle dispersion or the amount of the at least two (meth)acrylic acid esters used in the composite resin particle forming step, or by increasing or decreasing the length of time of maintaining a high temperature in the fusing and coalescing step.

The base particles having a core-shell structure are produced through the following steps, for example:

after an aggregated particle dispersion (hereinafter may be referred to as a first aggregated particle dispersion in which first aggregated particles are dispersed) is obtained in the aforementioned aggregated particle forming step, a step of mixing the aggregated particle dispersion and a styrene resin particle dispersion so that the styrene resin particles attach to the surfaces of the aggregated particles and form second aggregated particles (second aggregated particle forming step); and a step of heating the second aggregated particle dispersion in which the second aggregated particles are dispersed so as to fuse and coalesce the second aggregated particles and thereby form base particles having a core-shell structure (core-shell structure forming step).

The base particles having a core-shell structure obtained through the aforementioned steps have a shell layer containing a particular styrene resin.

Instead of the styrene resin particle dispersion, a resin particle dispersion in which a different type of resin particles are dispersed may be used to form a shell layer that contains the different type of resin.

After completion of the fusing and coalescing step, the base particles formed in liquid are subjected to a washing step, a solid-liquid separation step, and a drying step known in the art so as to obtain dry base particles.

From the viewpoint of chargeability, the washing step may involve thorough displacement washing with ion exchange water. From the viewpoint of productivity, the solid-liquid separation step may involve suction filtration, pressure filtration, or the like. From the viewpoint of productivity, the drying step may involve freeze-drying, flash-drying, fluid-drying, vibration-type fluid-drying, or the like.

The particular particles are formed by, for example, adding an external additive to the obtained dry base particles, and mixing the resulting mixture.

Mixing may be performed by using a V blender, a HENSCHEL mixer, a Lodige mixer, or the like.

If needed, a vibrating screen, an air screen, or the like may be used to remove coarse particles.

The particular particles may be directly applied for use or may be used as an electrostatic charge image developer. The electrostatic charge image developer may be a one-component developer that contains only the particular particles, or a two-component developer that is a mixture of the particular particles and a carrier.

The carrier is not particularly limited and may be any known carrier. Examples of the carrier include a coated carrier prepared by covering the surface of a magnetic powder core with a resin, a magnetic powder-dispersed carrier prepared by dispersing and blending magnetic powder in a matrix resin, and a resin-impregnated carrier prepared by impregnating porous magnetic powder with a resin. The magnetic powder-dispersed carrier and the resin-impregnated carrier may each be a carrier that has a core being composed of the particles constituting the carrier and having a resin-coated surface.

Examples of the magnetic powder include magnetic metals such as iron, nickel, and cobalt, and magnetic oxides such as ferrite and magnetite.

Examples of the resin for coating and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin containing an organosiloxane bond and modified products thereof, fluororesin, polyester, polycarbonate, phenolic resin, and epoxy resin. The resin for coating and the matrix resin may contain other additives, such as conductive particles. Examples of the conductive particles include particles of metals such as gold, silver, and copper, and particles of carbon black, titanium oxide, zinc oxide, tin oxide, barium sulfate, aluminum borate, and potassium titanate.

An example of the method for covering the surface of the core with the resin is a method that involves coating the surface of the core with a coating layer-forming solution prepared by dissolving the resin for coating and various additives (used as needed) in an appropriate solvent. The solvent is not particularly limited and may be selected by considering the type of the resin to be used, suitability of application, etc.

Specific examples of the resin coating method include a dipping method involving dipping cores in the coating-layer-forming solution, a spraying method involving spraying the coating-layer-forming solution onto core surfaces, a fluid bed method involving spraying a coating-layer-forming solution while having the cores float on a bed of air, and a kneader coater method involving mixing cores serving as carriers and a coating-layer-forming solution in a kneader coater and then removing the solvent.

In a two-component developer, the particular particles-to-carrier mixing ratio (mass ratio) is preferably 1:100 to 30:100 and is more preferably 3:100 to 20:100.

EXAMPLES

The exemplary embodiments of the present disclosure will now be described in detail through examples, but the present disclosure is not limited by these examples. In the description below, "parts" and "%" are on a mass basis unless otherwise noted.

Preparation of Dispersion Containing Styrene Resin Particles

Preparation of Styrene Resin Particle Dispersion (St1)

Styrene: 390 parts
n-Butyl acrylate: 100 parts
Acrylic acid: 10 parts
Dodecanethiol: 7.5 parts The above-described materials are mixed and dissolved to prepare a monomer solution.

In 205 parts of ion exchange water, 8 parts of an anionic surfactant (DOWFAX 2A1 produced by The Dow Chemical Company) is dissolved, and is dispersed and emulsified by adding the aforementioned monomer solution to obtain an emulsion.

In 462 parts of ion exchange water, 2.2 part of an anionic surfactant (DOWFAX 2A1 produced by The Dow Chemical Company) is dissolved. The resulting solution is charged into a polymerization flask equipped with a stirrer, a thermometer, a reflux cooling tube, and a nitrogen inlet tube and is heated to 73° C. under stirring, and the temperature is retained thereat.

In 21 parts of ion exchange water, 3 parts of ammonium persulfate is dissolved, and the resulting solution is added dropwise to the aforementioned polymerization flask over a period of 15 minutes via a metering pump. Then, the aforementioned emulsion is added dropwise thereto over a period of 160 minutes via a metering pump.

Subsequently, while slow stirring is continued, the polymerization flask is retained at 75° C. for 3 hours, and then the temperature is returned to room temperature (25° C.)

As a result, a styrene resin particle dispersion (St1) that contains styrene resin particles having a volume-average particle diameter (D50v) of 174 nm, a weight-average molecular weight of 49000 as determined by GPC (UV detection), and a glass transition temperature of 54° C., and that has a solid content of 42% is obtained.

The styrene resin particle dispersion (St1) is dried to obtain styrene resin particles, and the thermal behavior in the temperature range of −100° C. to 100° C. is analyzed with a differential scanning calorimeter (DSC-60A produced by Shimadzu Corporation). One glass transition temperature is observed. Table 1 indicates the glass transition temperature.

Preparation of Styrene Resin Particle Dispersions (St2) to (St13)

Styrene resin particle dispersions (St2) to (St13) are prepared as with the preparation of the styrene resin particle dispersion (St1) except that the monomers are changed as indicated in Table 1.

In Table 1, the monomers are abbreviated as follows.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA Preparation of Dispersion Containing Composite Resin Particles Preparation of Composite Resin Particle Dispersion (M1)

Styrene resin particle dispersion (St1): 1190 parts (solid content: 500 parts)
2-Ethylhexyl acrylate: 250 parts
n-Butyl acrylate: 250 parts
Ion exchange water: 982 parts The above-described materials are charged into a polymerization flask, stirred at 25° C. for 1 hour, and heated to 70° C.

In 75 parts of ion exchange water, 2.5 parts of ammonium persulfate is dissolved, and the resulting solution is added dropwise to the aforementioned polymerization flask over a period of 60 minutes via a metering pump.

Subsequently, while slow stirring is continued, the polymerization flask is retained at 70° C. for 3 hours, and then the temperature is returned to room temperature.

As a result, a composite resin particle dispersion (M1) that contains composite resin particles having a volume-average particle diameter (D50v) of 219 nm and a weight-average molecular weight of 219000 as determined by GPC (UV detection) and that has a solid content of 32% is obtained.

The composite resin particle dispersion (M1) is dried to obtain composite resin particles, and the thermal behavior in the temperature range of −150° C. to 100° C. is analyzed with a differential scanning calorimeter (DSC-60A produced by Shimadzu Corporation). Two glass transition temperatures are observed. Table 2 indicates the glass transition temperatures.

Preparation of Composite Resin Particle Dispersions (M2) to (M21) and (cM1) to (cM3)

Composite resin particle dispersions (M2) to (M21) and (cM1) to (cM3) are prepared as with the preparation of the composite resin particle dispersion (M1) except that the styrene resin particle dispersion (St1) is changed as described in Table 2 or that the polymerization components of the (meth)acrylic acid ester resin are changed as described in Table 2.

Preparation of Composite Resin Particle Dispersions (M22) to (M27)

Composite resin particle dispersions (M22) to (M27) are prepared as with the preparation of the composite resin

TABLE 1

| | Styrene resin particle dispersion | | | | | | | | | | |
|---|---|---|---|---|---|---|---|---|---|---|---|
| | Polymerization component (mass ratio) | | | | | | | | D50v of resin particles | Mw | Tg |
| No. | St | BA | 2EHA | EA | 4HBA | AA | MAA | CEA | nm | — | ° C. |
| St1 | 78 | 20 | 0 | 0 | 0 | 2 | 0 | 0 | 174 | 49000 | 54 |
| St2 | 88 | 10 | 0 | 0 | 0 | 2 | 0 | 0 | 170 | 50000 | 76 |
| St3 | 83 | 15 | 0 | 0 | 0 | 2 | 0 | 0 | 172 | 50000 | 65 |
| St4 | 78 | 20 | 0 | 0 | 0 | 0 | 2 | 0 | 177 | 48000 | 57 |
| St5 | 80 | 15 | 0 | 0 | 5 | 0 | 0 | 0 | 172 | 46000 | 55 |
| St6 | 80 | 15 | 0 | 0 | 0 | 0 | 0 | 0 | 174 | 51000 | 54 |
| St7 | 80 | 20 | 0 | 0 | 0 | 0 | 0 | 0 | 169 | 50000 | 54 |
| St8 | 77 | 20 | 0 | 0 | 0 | 0 | 0 | 3 | 168 | 48000 | 54 |
| St9 | 72 | 26 | 0 | 0 | 0 | 2 | 0 | 0 | 172 | 55000 | 43 |
| St10 | 68 | 30 | 0 | 0 | 0 | 2 | 0 | 0 | 173 | 53000 | 35 |
| St11 | 80 | 0 | 20 | 0 | 0 | 0 | 0 | 0 | 171 | 50000 | 56 |
| St12 | 78 | 0 | 20 | 0 | 0 | 2 | 0 | 0 | 167 | 49000 | 56 |
| St13 | 63 | 0 | 0 | 35 | 0 | 2 | 0 | 0 | 169 | 51000 | 54 | particle dispersion (M1) except that the amounts of 2-ethylhexyl acrylate and n-butyl acrylate used are adjusted.

In Table 2, the monomers are abbreviated as follows.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA, hexyl acrylate: HA, propyl acrylate: PA styrene resin particle dispersion (St1) is added thereto over a period of 5 minutes. After completion of addition, a temperature of 50° C. is held for 30 minutes, a 1.0% aqueous sodium hydroxide solution is added thereto, and the pH of the slurry is adjusted to 6.0. Subsequently, while the pH is adjusted to 6.0 every 5° C., the temperature is elevated at a temperature elevation rate of 1° C./minute up to 90° C., and

TABLE 2

Composite resin particle dispersion

| | | St resin | | | | Composite resin particles (or comparative resin particles) | | | |
|---|---|---|---|---|---|---|---|---|---|
| No. | St resin particle dispersion | Polymerization component | Tg ° C. | Ac resin Polymerization component | St resin/Ac resin mass ratio (St:Ac) | D50v of resin particles nm | Mw — | Tg ° C. | Tg ° C. |
| cM1 | St1 | St/BA/AA = 78/20/2 | 54 | 2EHA = 100 | 50:50 | 222 | 230000 | −50 | 54 |
| cM2 | St1 | St/BA/AA = 78/20/2 | 54 | BA = 100 | 50:50 | 225 | 220000 | −53 | 54 |
| cM3 | St12 | St/2EHA/AA = 78/20/2 | 56 | BA = 100 | 50:50 | 224 | 212000 | −53 | 56 |
| M1 | St1 | St/BA/AA = 78/20/2 | 54 | 2EHA/BA = 50/50 | 50:50 | 219 | 219000 | −52 | 54 |
| M2 | St2 | St/BA/AA = 88/10/2 | 76 | 2EHA/BA = 50/50 | 50:50 | 218 | 240000 | −52 | 76 |
| M3 | St3 | St/BA/AA = 83/15/2 | 65 | 2EHA/BA = 50/50 | 50:50 | 220 | 231000 | −52 | 65 |
| M4 | St4 | St/BA/MAA = 78/20/2 | 57 | 2EHA/BA = 50/50 | 50:50 | 221 | 250000 | −52 | 57 |
| M5 | St5 | St/BA/4HBA = 80/15/5 | 55 | 2EHA/BA = 50/50 | 50:50 | 224 | 242000 | −52 | 55 |
| M6 | St6 | St/BA/2EHA = 80/15/5 | 54 | 2EHA/BA = 50/50 | 50:50 | 225 | 233000 | −52 | 54 |
| M7 | St7 | St/BA = 80/20 | 54 | 2EHA/BA = 50/50 | 50:50 | 224 | 243000 | −52 | 54 |
| M8 | St8 | St/BA/CEA = 77/20/3 | 54 | 2EHA/BA = 50/50 | 50:50 | 222 | 260000 | −52 | 54 |
| M9 | St9 | St/BA/AA = 72/26/2 | 43 | 2EHA/BA = 50/50 | 50:50 | 223 | 251000 | −52 | 43 |
| M10 | St10 | St/BA/AA = 68/30/2 | 35 | 2EHA/BA = 50/50 | 50:50 | 220 | 243000 | −52 | 35 |
| M11 | St11 | St/2EHA = 80/20 | 56 | 2EHA/BA = 50/50 | 50:50 | 221 | 249000 | −52 | 56 |
| M12 | St12 | St/2EHA/AA = 78/20/2 | 56 | 2EHA/BA = 50/50 | 50:50 | 227 | 237000 | −52 | 56 |
| M13 | St12 | St/2EHA/AA = 78/20/2 | 56 | 2EHA/HA = 50/50 | 50:50 | 224 | 226000 | −55 | 56 |
| M14 | St13 | St/EA/AA = 63/35/2 | 54 | 2EHA/PA = 50/50 | 50:50 | 224 | 243000 | −45 | 54 |
| M15 | St1 | St/BA/AA = 78/20/2 | 54 | 2EHA/HA = 50/50 | 50:50 | 226 | 270000 | −54 | 54 |
| M16 | St1 | St/BA/AA = 78/20/2 | 54 | 2EHA/BA = 90/10 | 50:50 | 224 | 264000 | −51 | 54 |
| M17 | St1 | St/BA/AA = 78/20/2 | 54 | 2EHA/BA = 80/20 | 50:50 | 226 | 248000 | −52 | 54 |
| M18 | St1 | St/BA/AA = 78/20/2 | 54 | 2EHA/BA = 70/30 | 50:50 | 226 | 260000 | −52 | 54 |
| M19 | St1 | St/BA/AA = 78/20/2 | 54 | 2EHA/BA = 30/70 | 50:50 | 225 | 273000 | −52 | 54 |
| M20 | St1 | St/BA/AA = 78/20/2 | 54 | 2EHA/BA = 20/80 | 50:50 | 224 | 233000 | −52 | 54 |
| M21 | St1 | St/BA/AA = 78/20/2 | 54 | 2EHA/BA = 10/90 | 50:50 | 223 | 243000 | −53 | 54 |
| M22 | St1 | St/BA/AA = 78/20/2 | 54 | 2EHA/BA = 50/50 | 90:10 | 182 | 180000 | −52 | 54 |
| M23 | St1 | St/BA/AA = 78/20/2 | 54 | 2EHA/BA = 50/50 | 80:20 | 190 | 210000 | −52 | 54 |
| M24 | St1 | St/BA/AA = 78/20/2 | 54 | 2EHA/BA = 50/50 | 70:30 | 199 | 223000 | −52 | 54 |
| M25 | St1 | St/BA/AA = 78/20/2 | 54 | 2EHA/BA = 50/50 | 30:70 | 259 | 300000 | −52 | 54 |
| M26 | St1 | St/BA/AA = 78/20/2 | 54 | 2EHA/BA = 50/50 | 20:80 | 300 | 320000 | −52 | 54 |
| M27 | St1 | St/BA/AA = 78/20/2 | 54 | 2EHA/BA = 50/50 | 10:90 | 380 | 331000 | −52 | 54 |

Preparation of Particular Particles
Preparation of Particular Particles (1) and Developer (1)
 Composite resin particle dispersion (M1): 504 parts
 Ion exchange water: 710 parts
 Anionic surfactant (DOWFAX 2A1 produced by The Dow Chemical Company): 1 part The above-described materials are placed in a reactor equipped with a thermometer and a pH meter, and the pH is adjusted to 3.0 by adding a 1.0% aqueous nitric acid solution at a temperature of 25° C. Then, while the resulting mixture is dispersed in a homogenizer (ULTRA-TURRAX T50 produced by IKA Japan) at a rotation rate of 5000 rpm, 23 parts of a 2.0% aqueous aluminum sulfate solution is added. Subsequently, a stirrer and a heating mantle are attached to the reactor. The temperature is elevated at a temperature elevation rate of 0.2° C./minute up to a temperature of 40° C. and then at 0.05° C./minute beyond 40° C. The particle diameter is measured every 10 minutes with MULTISIZER II (aperture diameter: 50 μm, produced by Beckman Coulter Inc.). The temperature is retained when the volume-average particle diameter reached 5.0 μm, and 170 parts of the the temperature is retained at 90° C. The particle shape and the surface property are observed with an optical microscope and a field emission-type scanning electron microscope (FE-SEM), and coalescence of particles is confirmed at the 10th hour. The reactor is then cooled with cooling water over a period of 5 minutes to 30° C.

The cooled slurry is passed through a nylon mesh having an aperture of 15 μm to remove coarse particles, and the slurry that has passed through the mesh is filtered at a reduced pressure by using an aspirator. The solid matter remaining on the paper filter is manually pulverized as finely as possible and is added to ion exchange water (temperature: 30° C.) in an amount ten times the amount of the solid matter. The resulting mixture is stirred for 30 minutes. Subsequently, the solid matter remaining on the paper filter after filtration at a reduced pressure in an aspirator is pulverized manually as finely as possible and is added to ion exchange water (temperature: 30° C.) in an amount ten times the amount of the solid matter. The resulting mixture is stirred for 30 minutes and is again filtered at a reduced pressure with an aspirator. The electrical conductivity of the filtrate is measured. This operation is repeated until the electrical conductivity of the filtrate is 10 μS/cm or less so as to wash the solid matter.

The washed solid matter is finely pulverized in a wet-dry-type particle sizer (Comil) and then vacuum-dried in an oven at 25° C. for 36 hours. As a result, base particles (1) are obtained. The volume-average particle diameter of the base particles (1) is 8.0 μm.

One hundred parts of the base particles (1) and 1.5 parts of hydrophobic silica (RY50 produced by Nippon Aerosil Co., Ltd.) are mixed in a sample mill at a rotation rate of 13000 rpm for 30 seconds. The mixture is then screened through a vibrating screen having an aperture of 45 μm. As a result, particular particles (1) are obtained.

Using the particular particles (1) as a sample, the thermal behavior in the temperature range of −150° C. to 100° C. is analyzed with a differential scanning calorimeter (DSC-60A produced by Shimadzu Corporation). Two glass transition temperatures are observed. Table 3 indicates the glass transition temperatures.

The temperature T1 and the temperature T2 of the particular particles (1) are measured with the aforementioned measuring method, and the particular particles (1) satisfy formula 1, "10° C.≤T1−T2".

A section of the particular particles (1) is observed with a scanning electron microscope (SEM). A sea-island structure is observed. The particular particles (1) have a core in which island phases are present, and a shell layer in which no island phases are present. The sea phase contains a styrene resin, and the island phases contain a (meth)acrylic acid ester resin. The average size of the island phases is determined by the aforementioned measuring method. The average size of the island phases is indicated in Table 3.

A chromatic color image including both black characters and a full-color photographic image and having an image density of 30% is formed over the entirety of an image forming surface of a recording medium by using an ink jet recording apparatus.

Next, the particular particles (A1) are applied at 2.5 g/m² from one end of a short side to the other end of the short side such that the applied portion has a width of 1 cm and extends parallel to an end portion of a recording medium while leaving a margin in the range 3 mm from the end portion of the recording medium. The recording medium is then passed through a belt roll-type fixing device so as to fix the pressure-responsive particles to the image forming surface of the recording medium and form a layer of the pressure-responsive particles.

In the pressure bonding step, a multilayer body obtained by collating thirty sheets of images obtained by bonding the particles onto a recording medium is pressure-bonded by using a modified model of pressure-bonding sealer PRESSELE LEADA (produced by Toppan Forms Co., Ltd.) to prepare a printed material. The obtained printed material is cut in a direction parallel to the short side to form a rectangular sample having a width of 15 mm. The peel force is confirmed in the first, tenth, and twentieth sheets of that sample. All exhibit a peeling force exceeding 1N.

Into a V-type blender, 10 parts of the particular particles (1) and 100 parts of the following resin-coated carrier are placed, and the resulting mixture is stirred for 20 minutes. Then the mixture is screened through a vibrating screen having an aperture of 212 μm to obtain a developer (1).

Mn—Mg—Sr ferrite particles (average particle diameter: 40 μm: 100 parts
Toluene: 14 parts
Polymethyl methacrylate: 2 parts
Carbon black (VXC72 produced by Cabot Corporation): 0.12 parts Glass beads (diameter: 1 mm, in an amount equal to the amount of toluene) and the above-described materials other than the ferrite particles are mixed, and the resulting mixture is stirred in a sand mill produced by KANSAI PAINT CO., LTD., at a rotation rate of 1200 rpm for 30 minutes. As a result, a dispersion is obtained. The dispersion and the ferrite particles are placed in a vacuum deaerator-type kneader, and the resulting mixture is dried at a reduced pressure under stirring to obtain a resin-coated carrier.

Preparation of Particular Particles (2) to (27) and Developers (2) to (27)

Particular particles (2) to (27) and developers (2) to (27) are prepared as with the preparation of the particular particles (1) except that the composite resin particle dispersion and the styrene resin particle dispersion are changed as indicated in Table 3.

The temperature T1 and the temperature T2 of the particular particles (2) to (27) are measured with the aforementioned measuring method, and the particular particles (2) to (27) all satisfy formula 1, "10° C.≤T1−T2".

Preparation of Comparative Particles (c1) to (c3) and Developers (c1) to (c3)

Particles (c1) to (c3) and developers (c1) to (c3) are prepared as with the preparation of the particular particles (1) except that the composite resin particle dispersion and the styrene resin particle dispersion are changed as indicated in Table 3.

Evaluation of Pressure-Responsive Phase Transition

The temperature difference (T1−T3), which is the indicator of how easily the particles undergo pressure-induced phase transition, is determined. For each particle sample, the temperature T1 and the temperature T3 are measured with a Flowtester (CFT-500 produced by Shimadzu Corporation), and the temperature difference (T1−T3) is calculated. Table 3 indicates the temperature difference (T1−T3).

Evaluation of Bonding Force in Bound Portion

As the apparatus for producing a printed material, a printed material producing apparatus (modified model of Color 1000 Press produced by Fuji Xerox Co., Ltd.) equipped with a five-stand-tandem intermediate transfer-type printing section that performs placement of the particular particles and formation of color images on a recording medium, and a pressure bonding section that has a multilayer body forming device and a pressurizing device is prepared.

The particular particles (or comparative particles) of this exemplary embodiment, a yellow toner, a magenta toner, a cyan toner, and a black toner are respectively placed in five developing devices in the printing section. Commercially available products produced by Fuji Xerox Co., Ltd., are used as the yellow toner, the magenta toner, the cyan toner, and the black toner.

Recording sheets (C2 paper produced by Fuji Xerox Co., Ltd.) are prepared as the recording media.

The color image to be formed on a recording medium is an image having an area density of 30% in which black characters and a full-color photographic image are both contained. The image is formed on one surface of the recording medium.

The particular particles of the exemplary embodiment (or comparative particles) are provided by forming a solid image that extends from one end to the other end of a short side so as to be parallel to an end portion and has a width of 1 cm at a loading amount of 2.5 g/m² while leaving a margin in the range 3 mm or less from the end portion in the particular region that extends along the short side of the image forming surface of the recording medium.

In the bonding step, the particles are bonded to the recording medium at a particle heating temperature of 170° C. and an applied pressure of 4.0 kg/cm².

In the pressure bonding step, a multilayer body obtained by collating thirty sheets of images obtained by bonding the particles onto recording media is pressure-bonded by using a modified model of pressure-bonding sealer PRESSELE LEADA (produced by Toppan Forms Co., Ltd.) to prepare a printed material. The obtained printed material is cut in a direction parallel to the short side to form a rectangular sample having a width of 15 mm. The peel force is measured by a known method (90 degrees peel method) on the first, tenth, and twentieth sheets of that sample, and the results are averaged. The results are indicated in Table 3.

In the pressure-bonding step, the pressure applied is 90 MPa.

TABLE 3

| Particles | Composite resin particle dispersion | Core Polymerization components of St resin | Polymerization components of Ac resin | St resin/ Ac resin mass ratio (St:Ac) | Shell layer St resin particle dispersion | Particles Average size of island phases D50v μm | | Tg nm | °C. | Difference in Tg °C. | T3 °C. | Pressure-responsive phase transition (T1-T3) °C. | Bonding force (N) |
|---|---|---|---|---|---|---|---|---|---|---|---|---|---|
| c1 | cM1 | St/BA/AA = 78/20/2 | 2EHA = 100 | 50:50 | St1 | 8.0 | 600 | −50 | 54 | 104 | 95 | 3 | 0.3 |
| c2 | cM2 | St/BA/AA = 78/20/2 | BA = 100 | 50:50 | St1 | 8.0 | 550 | −53 | 54 | 107 | 93 | 4 | 0.3 |
| c3 | cM3 | St/2EHA/AA = 78/20/2 | BA = 100 | 50:50 | St12 | 11.0 | 570 | −53 | 56 | 109 | 93 | 4 | 0.3 |
| 1 | M1 | St/BA/AA = 78/20/2 | 2EHA/BA = 50/50 | 50:50 | St1 | 8.0 | 200 | −52 | 54 | 106 | 75 | 15 | 1.4 |
| 2 | M2 | St/BA/AA = 88/10/2 | 2EHA/BA = 50/50 | 50:50 | St2 | 11.0 | 250 | −52 | 76 | 128 | 70 | 13 | 1.4 |
| 3 | M3 | St/BA/AA = 83/15/2 | 2EHA/BA = 50/50 | 50:50 | St3 | 11.0 | 280 | −52 | 65 | 117 | 78 | 15 | 1.6 |
| 4 | M4 | St/BA/MAA = 78/20/2 | 2EHA/BA = 50/50 | 50:50 | St4 | 11.0 | 240 | −52 | 57 | 109 | 70 | 10 | 1.5 |
| 5 | M5 | St/BA/4HBA = 80/15/5 | 2EHA/BA = 50/50 | 50:50 | St5 | 11.0 | 240 | −52 | 55 | 107 | 74 | 16 | 1.6 |
| 6 | M6 | St/BA/2EHA = 80/15/5 | 2EHA/BA = 50/50 | 50:50 | St6 | 11.0 | 250 | −52 | 54 | 106 | 73 | 14 | 1.4 |
| 7 | M7 | St/BA = 80/20 | 2EHA/BA = 50/50 | 50:50 | St7 | 9.5 | 250 | −52 | 54 | 106 | 73 | 13 | 1.4 |
| 8 | M8 | St/BA/CEA = 77/20/3 | 2EHA/BA = 50/50 | 50:50 | St8 | 9.5 | 250 | −52 | 54 | 106 | 75 | 10 | 1.3 |
| 9 | M9 | St/BA/AA = 72/26/2 | 2EHA/BA = 50/50 | 50:50 | St9 | 9.5 | 220 | −52 | 43 | 95 | 75 | 15 | 1.6 |
| 10 | M10 | St/BA/AA = 68/30/2 | 2EHA/BA = 50/50 | 50:50 | St10 | 9.5 | 230 | −52 | 35 | 87 | 73 | 15 | 1.5 |
| 11 | M11 | St/2EHA = 80/20 | 2EHA/BA = 50/50 | 50:50 | St11 | 9.5 | 220 | −52 | 56 | 108 | 72 | 15 | 1.6 |
| 12 | M12 | St/2EHA/AA = 78/20/2 | 2EHA/BA = 50/50 | 50:50 | St12 | 9.5 | 230 | −52 | 56 | 108 | 75 | 20 | 1.8 |
| 13 | M13 | St/2EHA/AA = 78/20/2 | 2EHA/HA = 50/50 | 50:50 | St12 | 5.8 | 250 | −55 | 56 | 111 | 70 | 15 | 1.5 |
| 14 | M14 | St/EA/AA = 63/35/2 | 2EHA/PA = 50/50 | 50:50 | St13 | 5.8 | 350 | −45 | 54 | 99 | 80 | 5 | 1.3 |
| 15 | M15 | St/BA/AA = 78/20/2 | 2EHA/HA = 50/50 | 50:50 | St1 | 5.8 | 400 | −54 | 54 | 108 | 81 | 7 | 1.3 |
| 16 | M16 | St/BA/AA = 78/20/2 | 2EHA/BA = 90/10 | 50:50 | St1 | 8.0 | 400 | −51 | 54 | 105 | 80 | 10 | 1.4 |
| 17 | M17 | St/BA/AA = 78/20/2 | 2EHA/BA = 80/20 | 50:50 | St1 | 8.0 | 300 | −52 | 54 | 106 | 70 | 20 | 1.7 |
| 18 | M18 | St/BA/AA = 78/20/2 | 2EHA/BA = 70/30 | 50:50 | St1 | 8.0 | 250 | −52 | 54 | 106 | 75 | 15 | 1.4 |
| 19 | M19 | St/BA/AA = 78/20/2 | 2EHA/BA = 30/70 | 50:50 | St1 | 8.0 | 250 | −52 | 54 | 106 | 73 | 15 | 1.5 |
| 20 | M20 | St/BA/AA = 78/20/2 | 2EHA/BA = 20/80 | 50:50 | St1 | 8.0 | 300 | −52 | 54 | 106 | 75 | 20 | 1.8 |
| 21 | M21 | St/BA/AA = 78/20/2 | 2EHA/BA = 10/90 | 50:50 | St1 | 8.0 | 400 | −53 | 54 | 107 | 80 | 9 | 1.3 |
| 22 | M22 | St/BA/AA = 78/20/2 | 2EHA/BA = 50/50 | 90:10 | St1 | 8.0 | 450 | −52 | 54 | 106 | 85 | 5 | 1.2 |
| 23 | M23 | St/BA/AA = 78/20/2 | 2EHA/BA = 50/50 | 80:20 | St1 | 8.0 | 400 | −52 | 54 | 106 | 80 | 10 | 1.3 |

TABLE 3-continued

| | | Core | | | | Particles | | | | | | | |
|---|---|---|---|---|---|---|---|---|---|---|---|---|---|
| Particles | Composite resin particle dispersion | Polymerization components of St resin | Polymerization components of Ac resin | St resin/ Ac resin mass ratio (St:Ac) | Shell layer St resin particle dispersion | Average size of island phases | | | | | | Pressure-responsive phase transition (T1-T3) | Bonding force |
| | | | | | | D50v μm | nm | Tg °C. | °C. | Difference in Tg °C. | T3 °C. | °C. | (N) |
| 24 | M24 | St/BA/AA = 78/20/2 | 2EHA/BA = 50/50 | 70:30 | St1 | 8.0 | 250 | −52 | 54 | 106 | 75 | 15 | 1.6 |
| 25 | M25 | St/BA/AA = 78/20/2 | 2EHA/BA = 50/50 | 30:70 | St1 | 8.0 | 210 | −52 | 54 | 106 | 73 | 13 | 1.2 |
| 26 | M26 | St/BA/AA = 78/20/2 | 2EHA/BA = 50/50 | 20:80 | St1 | 8.0 | 230 | −52 | 54 | 106 | 72 | 13 | 1.2 |
| 27 | M27 | St/BA/AA = 78/20/2 | 2EHA/BA = 50/50 | 10:90 | St1 | 8.0 | 250 | −52 | 54 | 106 | 72 | 13 | 1.1 |

As apparent from Table 3 above, the bonding force in the bound portion is high in the examples that use the particular particles compared to the examples in which particles c1 to c3 are used.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a printed material, the method comprising:
   providing pressure-induced phase transition particles to a part of an outside margin portion or a portion to be folded of a recording medium;
   bonding the pressure-induced phase transition particles to the recording medium; and
   pressure-bonding a multilayer body in which a plurality of recording media are stacked, the recording media including the recording medium having the pressure-induced phase transition particles bonded thereon,
   wherein the pressure-induced phase transition particles contain a styrene resin containing styrene and a vinyl monomer other than styrene as polymerization components, and a (meth)acrylic acid ester resin that contains at least two (meth)acrylic acid esters as polymerization components, and a mass ratio of the (meth)acrylic acid esters relative to a total of polymerization components of the (meth)acrylic acid ester resin is 90 mass % or more, and
   the pressure-induced phase transition particles have at least two glass transition temperatures, and the difference between the lowest glass transition temperature and the highest glass transition temperature among the glass transition temperatures exhibited by the pressure-induced phase transition particles is 30° C. or more.

2. The method for producing a printed material according to claim 1, wherein the pressure-induced phase transition particles are provided to one side of an outside margin portion of the recording medium.

3. The method for producing a printed material according to claim 1, further comprising performing folding.

4. The method for producing a printed material according to claim 3, wherein the pressure bonding is performed after the folding.

5. The method for producing a printed material according to claim 1, wherein the portion to be folded of the recording medium is positioned in a center portion of the recording medium.

6. The method for producing a printed material according to claim 1, wherein a mass ratio of styrene is within a range of 60 mass % to 95 mass % of a total of all polymerization components of the styrene resin in the pressure-induced phase transition particles.

7. The method for producing a printed material according to claim 1, wherein a mass ratio between two (meth)acrylic acid esters contained at the largest mass ratio and the second largest mass ratio among the at least two (meth)acrylic acid esters contained as polymerization components of the (meth) acrylic acid ester resin in the pressure-induced phase transition particles is within a range of 80:20 to 20:80.

8. The method for producing a printed material according to claim 1, wherein two (meth)acrylic acid esters contained at the largest mass ratio and the second largest mass ratio among the at least two (meth)acrylic acid esters contained as polymerization components of the (meth)acrylic acid ester resin in the pressure-induced phase transition particles are (meth)acrylic acid alkyl esters, and a difference in the number of carbon atoms of alkyl groups in the two (meth) acrylic acid alkyl esters is within a range of 1 to 4.

9. The method for producing a printed material according to claim 1, wherein the vinyl monomer contained as a polymerization component of the styrene resin in the pressure-induced phase transition particles contains a (meth) acrylic acid ester.

10. The method for producing a printed material according to claim 1, wherein the vinyl monomer contained as a polymerization component of the styrene resin in the pressure-induced phase transition particles is selected from n-butyl acrylate and 2-ethylhexyl acrylate.

11. The method for producing a printed material according to claim 1, wherein the styrene resin and the (meth) acrylic acid ester resin in the pressure-induced phase transition particles contain the same (meth)acrylic acid ester as a polymerization component.

12. The method for producing a printed material according to claim 1, wherein the (meth)acrylic acid ester resin in the pressure-induced phase transition particles contains 2-ethylhexyl acrylate and n-butyl acrylate as polymerization components.

13. The method for producing a printed material according to claim 1, wherein the pressure-induced phase transition particles contain a larger amount of the styrene resin than the (meth)acrylic acid ester resin.

14. The method for producing a printed material according to claim 1, wherein the pressure-induced phase transition particles have a sea phase containing the styrene resin and island phases containing the (meth)acrylic acid ester resin and being dispersed in the sea phase.

15. The method for producing a printed material according to claim 14, wherein the island phases have an average size within a range of 200 nm to 500 nm.

16. The method for producing a printed material according to claim 1, wherein the pressure-induced phase transition particles have a core that contains the styrene resin and the (meth)acrylic acid ester resin, and a shell layer covering the core.

17. The method for producing a printed material according to claim 16, wherein the shell layer contains the styrene resin.

18. The method for producing a printed material according to claim 1, wherein a temperature at which the pressure-induced phase transition particles exhibit a viscosity of 10000 Pa·s at a pressure of 4 MPa is 90° C. or less.

19. A system for producing a printed material, the system comprising:
a pressure-induced phase transition particle providing unit that contains pressure-induced phase transition particles and provides the pressure-induced phase transition particles to one part of an outside margin portion or a portion to be folded of a recording medium;
a bonding unit that bonds the pressure-induced phase transition particles to the recording medium; and
a pressure bonding unit that pressure-bonds a multilayer body in which a plurality of recording media are stacked, the recording media including the recording medium having the pressure-induced phase transition particles bonded thereon,
wherein the pressure-induced phase transition particles contain a styrene resin containing styrene and a vinyl monomer other than styrene as polymerization components, and a (meth)acrylic acid ester resin that contains at least two (meth)acrylic acid esters as polymerization components, and a mass ratio of the (meth)acrylic acid esters relative to a total of polymerization components of the (meth)acrylic acid ester resin is 90 mass or more, and
the pressure-induced phase transition particles have at least two glass transition temperatures, and the difference between the lowest glass transition temperature and the highest glass transition temperature among the glass transition temperatures exhibited by the pressure-induced phase transition particles is 30° C. or more.

* * * * *